(12) United States Patent
Fujita et al.

(10) Patent No.: US 6,374,258 B1
(45) Date of Patent: Apr. 16, 2002

(54) DATA RECORDING AND REPRODUCING APPARATUS AND METHOD FOR RECORDING AND REPRODUCING DATA FROM A NON-LINEAR RECORDING MEDIUM

(75) Inventors: Hiroyuki Fujita; Norikazu Ito; Satoshi Yoneya; Masakazu Yoshimoto; Satoshi Katsuo; Satoshi Yutani; Tomohisa Shiga; Jun Yoshikawa, all of Kanagawa; Koichi Sato, Tokyo, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/190,945

(22) Filed: Nov. 13, 1998

(30) Foreign Application Priority Data

Nov. 17, 1997 (JP) .............................................. 9-315647

(51) Int. Cl.[7] .............................................. G06F 13/00
(52) U.S. Cl. ........................ 707/104; 707/206; 711/160; 369/272; 386/96
(58) Field of Search ................................. 707/104, 200, 707/206; 711/4, 160; 710/74; 369/272; 386/96

(56) References Cited

U.S. PATENT DOCUMENTS

| | | | | | |
|---|---|---|---|---|---|
| 4,965,680 A | * | 10/1990 | Endoh | ........................ | 360/60 |
| 5,717,663 A | * | 2/1998 | Fujita | ........................ | 369/32 |
| 5,987,621 A | * | 11/1999 | Duso et al. | ................... | 714/4 |
| 6,108,728 A | * | 8/2000 | Kobayashi | ................... | 710/74 |

* cited by examiner

Primary Examiner—Jean R. Homere
(74) Attorney, Agent, or Firm—Frommer Lawrence & Haug LLP; William S. Frommer; Gordon Kessler

(57) ABSTRACT

In a data recording and reproducing apparatus (10), according to a release instruction from a server controller (30) added to a PLAY_OPEN command for requesting preparation of reproduction of arbitrary data, management information is changed so that an area occupied by reproduced data of the data in the on-producing file becomes an area where new data can be recorded anytime while the file is reproduced. As a result, for example, in the case where plural data are recorded, before the reproduction of the on-reproducing file is completed, the data recording area occupied by the reproduced data is changed into an area where new data can be recorded by efficiently utilizing recording areas in a data accumulation section (13) if on-producing file exists.

22 Claims, 27 Drawing Sheets

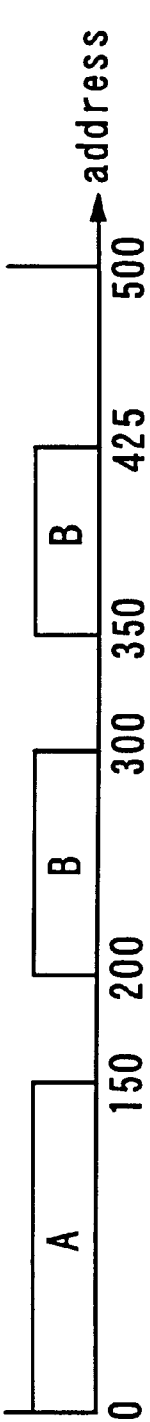
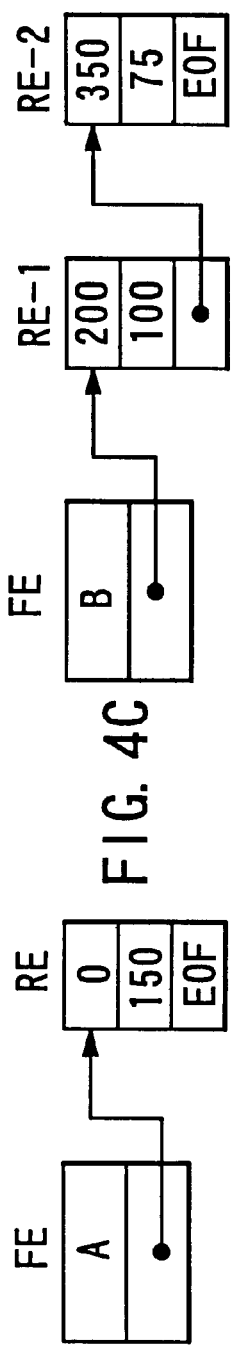
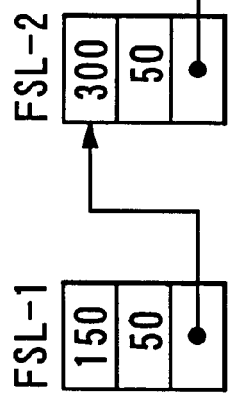
FIG. 4A
FIG. 4B
FIG. 4C
FIG. 4D

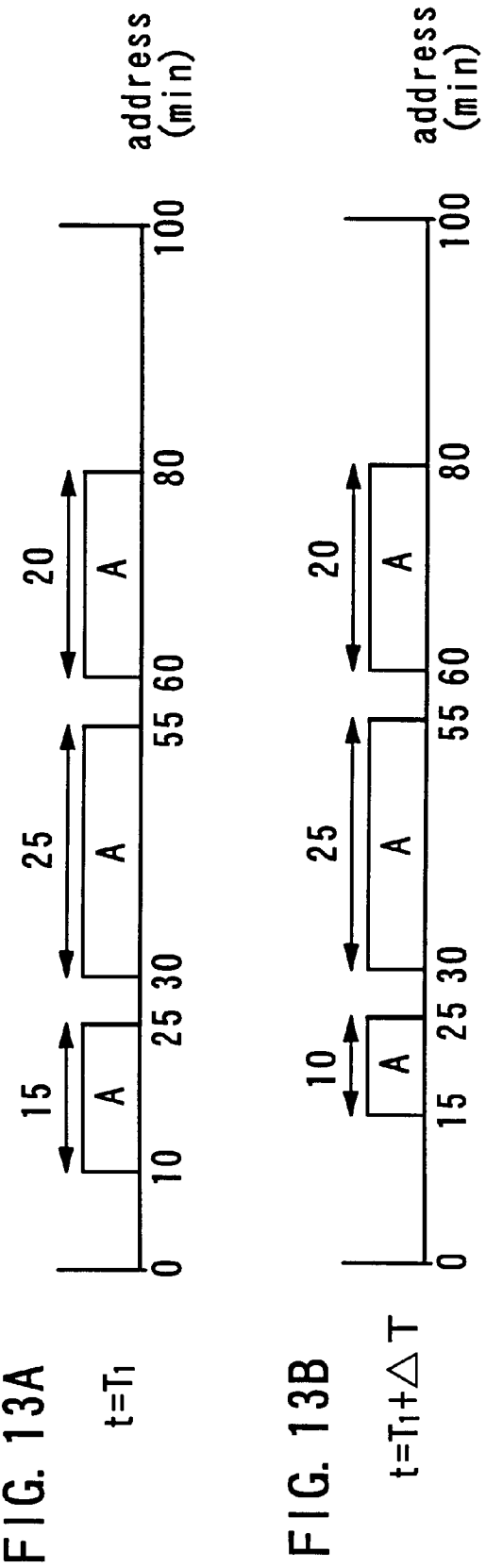

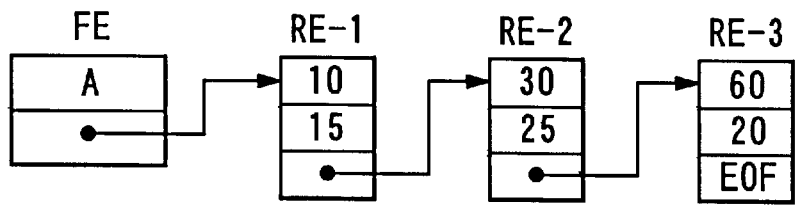
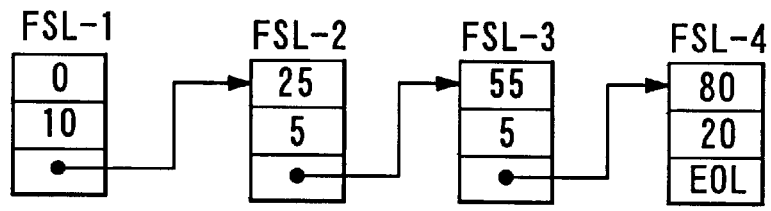
FIG. 14A
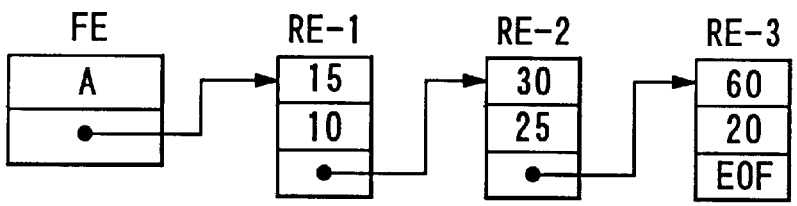
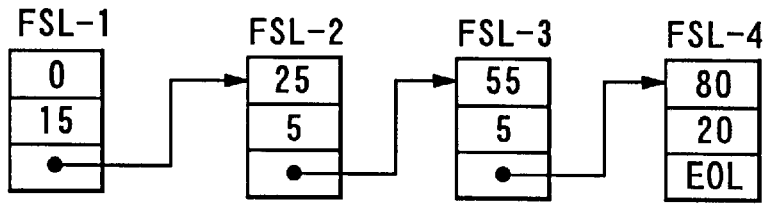
FIG. 14B

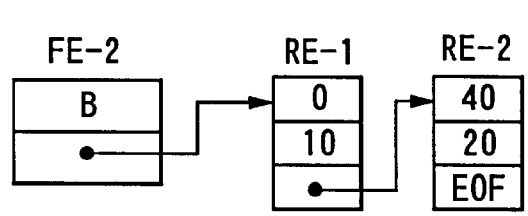

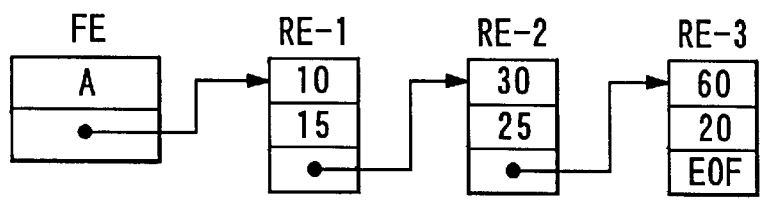
FIG. 22A
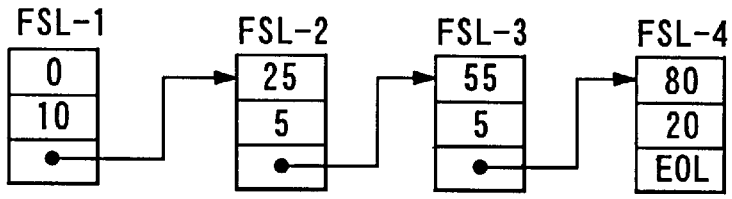
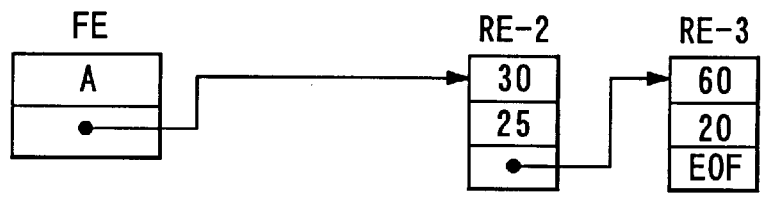
FIG. 22B
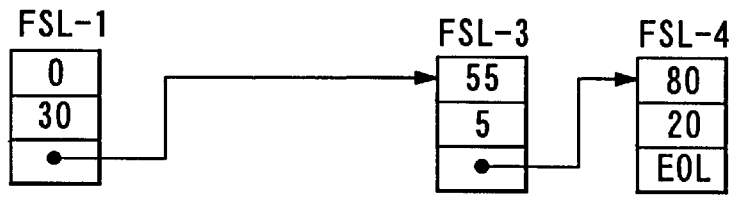
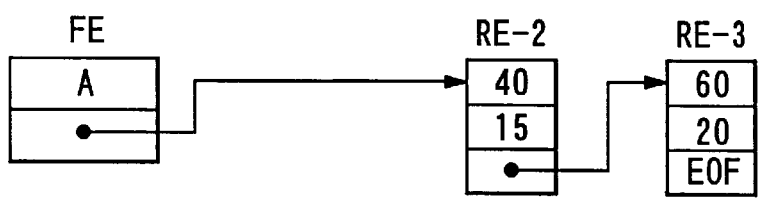
FIG. 22C
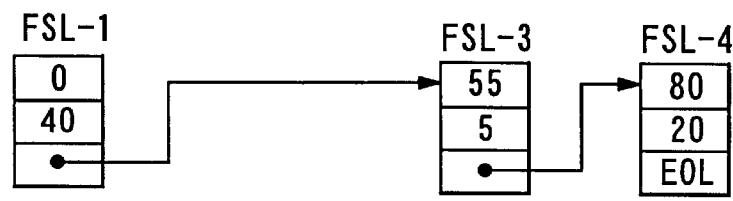

DATA RECORDING AND REPRODUCING APPARATUS AND METHOD FOR RECORDING AND REPRODUCING DATA FROM A NON-LINEAR RECORDING MEDIUM

BACKGROUND OF THE INVENTION

1. Field of the Invention

The present invention relates to a data recording and reproducing apparatus and method for recording and reproducing data including audio/visual data (AV data) and the like.

2. Description of the Related Art

In recent years, following multi-channeling for provision of information owing to the spread of CATV (cable television) or the like, a demand for reproducing plural data simultaneously from single data recording and reproducing apparatus, unlike conventional VCRs (video cassette recorder), has become higher. In order to satisfy this demand, a data recording and reproducing apparatus called AV (Audio/Visual) server, which records and reproduces plural audio/visual data using a random accessible recording and reproducing medium such as a semiconductor memory or a hard disk, is spreading.

FIG. 27 is a functional block diagram showing a schematic constitution of a data recording and reproducing apparatus of the related art.

This data recording and reproducing apparatus is used as, for example, an AV server in a broadcasting station and the like, and it can record and reproduce data simultaneously. The data recording and reproducing apparatus has control signal input means 101, server control means 102, data accumulation means 103, file system management means 104, data input means 105 and data output means 106. The control signal input means 101 inputs an input control signal $S_1$ for recording data and an output control signal $S_2$ for reproducing data thereinto from outside in real time. The server control means 102 controls respective means in the apparatus based on the control signals $S_1$ and $S_2$ inputted into the control signal input means 101. The data accumulation means 103 is composed of semiconductor memories, hard disks or the like, and can record and reproduce data such as audio/visual data thereinto/therefrom. The file system management means 104 has management information (file system) for representing areas into which data have been recorded and areas (space areas) into which data can be recorded in areas of the data accumulation means 103, and it manages the areas for data recording in the data accumulation means 103 using the management information. The data input means 105 inputs data $D_{IN}$, to be recorded in the data accumulation means 103, thereinto. The data output means 106 outputs data $D_{OUT}$ reproduced from the data accumulation means 103.

In the data recording and reproducing apparatus having such a constitution, when the server control means 102 receives an input control signal $S_1$ which requests data recording from outside via the control signal input means 101, it reserves areas which are necessary for data recording in the data accumulation means 103 based on the management information owned by the file system management means 104, and thereafter records and accumulates inputted data $D_{IN}$ inputted via the data input means 105 into the data accumulation means 103. Moreover, when the server control means 102 receives an output control signal $S_2$ which requests data reproduction from outside via the control signal input means 101, it reproduces data from areas into which the data have been recorded to be reproduced in the data accumulation means 103 based on the management information owned by the file system management means 104, and outputs the reproduced data $D_{OUT}$ via the data output means 106. The aforementioned data process according to the data recording and reproduction operations is performed per file unit.

The following will describe one example of the procedure for recording and reproducing plural data in a data recording and reproducing apparatus of the related art. Here, the following description will refer to the case where a file A whose data amount is 40 minutes and a file B whose data amount is 30 minutes are recorded in the data accumulation means 103 whose data recording capacity is 60 minutes. Moreover, the following will refer to the case where all the areas for data recording in the data accumulation means 103 are free, and the file A and the file B are recorded in this order into the data accumulation means 103 in the free state, and respective recorded data are reproduced one by one.

First, all the areas of 60 minutes for data recording in the data accumulation means 103 before data recording are in a data recordable state, namely, in the free state. In this state, when the file A is recorded, the recording areas occupied by the file A are 40 minutes, so the recordable free areas are 20 minutes. Therefore, at this time, the file B whose data amount is 30 minutes cannot be recorded. Next, after the file A is reproduced, all the reproduced file A is deleted from the areas. At this time, all the areas of the data accumulation means 103 of 60 minutes are in recordable free state. Next, when the file B is recorded, the recording areas occupied by the file B are 30 minutes, so the residual recordable areas are 30 minutes.

In the aforementioned data process, in case where the file B is desired to be recorded quickly just after the file A, it would be expected that the file B would be recordable at the point of time when the file A has been reproduced for 10 minutes, since originally recordable areas (completely space areas) of 20 minutes and the areas of the 10 minutes for which the file A has already been reproduced make areas for 30 minutes, which would allow enough space areas for recording the file B. Actually, however, in a data recording and reproducing apparatus of the related art, since the data recording and reproduction processes are performed completely per file unit, partial deletion of data, i.e., partial release of area, is not possible. Accordingly, the file B cannot be recorded unless the file A is wholly deleted.

As mentioned above, in the data recording and reproducing apparatus, when data are reproduced, for example, for broadcasting a program, since recording areas corresponding to portions where data have been already reproduced are not necessary, it is desired that the above areas would be released in order to enlarge recordable areas so that new material data may be recorded therein. In the related art, however, release of the area has been possible only by deleting data per file unit, so in this case, new data would become recordable only after reproduction of data included in one file is completed and the reproduced file is deleted. For this reason, even if plural data are tried to be recorded, there have been many cases where data cannot be recorded because recordable areas are less, thereby arising a problem that efficient data recording has been hindered.

Such a problem arises easily in the case where a relatively great amount of material data such as programs provided by a broadcasting station is processed in an AV server with a relatively small capacity composed of a semiconductor memory, for example.

SUMMARY OF THE INVENTION

The present invention has been achieved with such points of view. It therefore is an object of the present invention to provide a data recording and reproducing apparatus and method which can utilize areas for data recording efficiently.

A data recording and reproducing apparatus according to the present invention comprises:

recording and reproducing means for recording and reproducing data by using a non-linear accessible recording medium;

control means for controlling the recording and reproducing means so that data recorded in the recording medium are reproduced, and for outputting reproduction position information which represents a reproduction position of the data in the recording medium, and a release instruction for, while the data are being reproduced from the recording medium, releasing an area in the recording medium where the reproduced data have been recorded so that new data can be recorded in the area;

data management means for managing management information which represents the area in the recording medium where the data have been recorded and a recordable area where data can be recorded, through changing the management information, based on the release instruction and the reproduction position information outputted from the control means, so that new data can be recorded in the area corresponding to the release instruction; and reproduction position transmission means for transmitting the reproduction position information outputted from the control means to the data management means.

In addition, a data recording and reproducing method according to the present invention is a method for recording and reproducing data by using a non-linear accessible recording medium, which includes:

the first step of reproducing data recorded in the recording medium and outputting reproduction position information which represents a reproduction position of data in the recording medium, and a release instruction for, while the data are being reproduced from the recording medium, releasing an area in the recording medium where the reproduced data have been recorded so that new data can be recorded in the area;

the second step of transmitting the reproduction position information outputted at the first step; and the third step of managing management information which represents the area in the recording medium where the data have been recorded and a recordable area where data can be recorded, through changing the management information, based on the release instruction outputted at the first step and the reproduction position information transmitted at the second step, so that new data can be recorded in the area corresponding to the release instruction.

In addition, another data recording and reproducing apparatus according to the present invention comprises:

recording and reproducing means for recording and reproducing data using a non-linear accessible recording medium; and control means for, while the data is being reproduced from the recording medium, inputting a release instruction for releasing an area in the recording medium where reproduced data have been recorded so that new data can be recorded in the area, and for controlling the recording and reproducing means through changing management information which represents the area in the recording medium where the data have been recorded and a recordable area where data can be recorded, based on the inputted release instruction, so that new data can be recorded in the area corresponding to the release instruction.

In addition, another data recording and reproducing method according to the present invention is a method for recording and reproducing data by using a non-linear accessible recording medium, which includes the steps of:

reproducing data recorded in the recording medium; and inputting a release instruction for releasing an area in the recording medium where reproduced data have been recorded so that new data can be recorded in the area while the data are being reproduced from the recording medium, and controlling recording and reproduction through changing management information which represents the area in the recording medium where the data have been recorded and a recordable area where data can be recorded, based on the inputted release instruction, so that new data can be recorded in the area corresponding to the release instruction.

In another data recording and reproducing apparatus or method according to the present invention, when the release instruction is inputted for, while the data are being reproduced from the recording medium, releasing the area in the recording medium where the reproduced data have been recorded so that new data can be recorded in the area, the management information, which represents the area in the recording medium where data have been recorded and the area where data can be recorded, is changed based on the inputted release instruction, thereby controlling the recording and reproduction so that new data can be recorded in the area corresponding to the release instruction.

The above and further objects and features of the present invention will more fully be apparent from the following detailed description.

BRIEF DESCRIPTION OF THE DRAWINGS

FIGS. 4A through 4D are explanatory diagrams showing a particular use example of the management information in shown in FIG. 3.

FIGS. 13A and 13B are explanatory diagrams showing particular examples of a change in the recording areas according to the operation shown in FIG. 12.

FIGS. 14A and 14B are explanatory diagrams showing particular examples of a change in the management information according to the operation shown in FIG. 12.

FIGS. 22A through 22C are explanatory diagrams showing particular examples of a change in the management information according to the operation shown in FIG. 20.

DETAILED DESCRIPTION OF THE PREFERRED EMBODIMENTS

There will be detailed below preferred embodiments of the present invention with reference to the diagrams.

Figure 1:
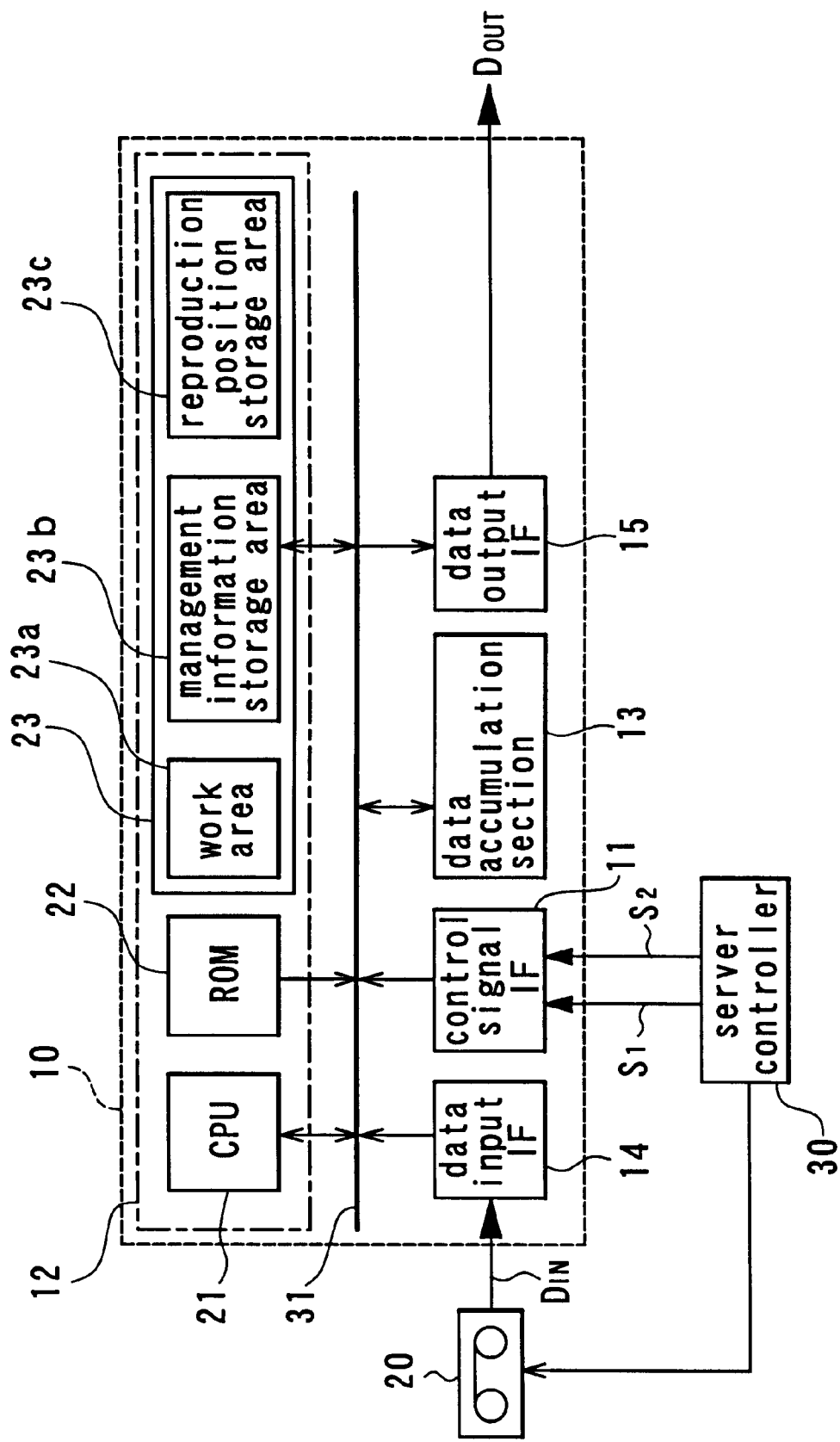
FIG. 1 is a block diagram showing a schematic constitution of a data recording and reproducing apparatus according to a first embodiment of the present invention.
Figure 2:
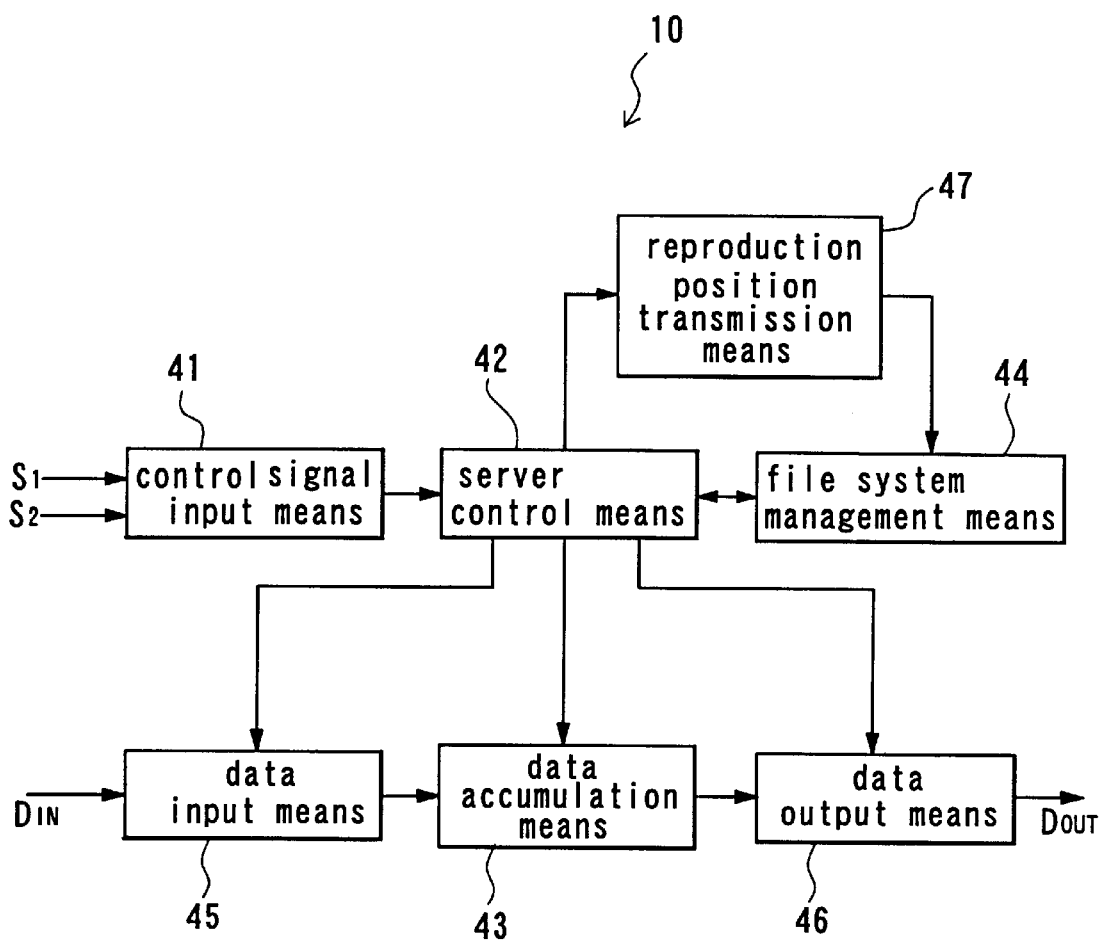
FIG. 2 is a functional block diagram for describing functions of the data recording and reproducing apparatus shown in FIG. 1.

FIG. 1 is a block diagram showing a constitution of a data recording and reproducing apparatus according to a first embodiment of the present invention. Moreover, FIG. 2 is a functional block diagram showing functions of the data recording and reproducing apparatus 10 shown in FIG. 1

The data recording and reproducing apparatus 10 according to the present embodiment can record and reproduce data simultaneously. As shown in FIG. 2, the data recording and reproducing apparatus 10 has, as functional blocks, control signal input means 41, server control means 42, data accumulation means 43, file system management means 44, data input means 45, data output means 46 and reproduction position transmission means 47. The control signal input means 41 inputs an input control signal $S_1$ used for recording data and an output control signal $S_2$ used for reproducing the data in real time thereinto from outside. The server control means 42 controls respective means in the apparatus based on the control signals $S_1$ and $S_2$ inputted into the control signal input means 41. The data accumulation means 43 is composed of a semiconductor memory, a hard disk and the like, and can record and reproduce data such as audio/visual data thereinto/therefrom. The file system management means 44 has management information (file system) for representing areas into which data have been recorded and areas into which data can be recorded in areas of the data accumulation means 43, and it manages the areas for data recording in the data accumulation means 43 using the management information. The data input means 45 inputs data $D_{IN}$, to be recorded in the data accumulation means 43, thereinto. The data output means 46 outputs data $D_{OUT}$ reproduced from the data accumulation means 43. The reproduction position transmission means 47 transmits information about a data reproduction position in the data accumulation means 43 to the file system management means 44 anytime while data in an arbitrary file in the data recording areas of the data accumulation means 43 are being reproduced. Here, the file system management means 44 corresponds to data management means of the present invention. Moreover, the server control means 42 corresponds to control means of the present invention.

In the data recording and reproducing apparatus 10, when the server control means 42 receives an input control signal $S_1$ which requests data recording from outside via the control signal input means 41, it reserves areas which are necessary for data recording in the data accumulation means 43 based on the management information owned by the file system management means 44, and thereafter records and accumulates inputted data $D_{IN}$ inputted via the data input means 45 into the data accumulation means 43. Moreover, when the server control means 42 receives an output control signal $S_2$ which requests data reproduction from outside via the control signal input means 41, it reproduces data from areas into which the data have been recorded to be reproduced in the data accumulation means 43 based on the management information owned by the file system management means 44, and outputs the reproduced data Dour from the data accumulation means 43 via the data output means 46.

In order to realize the aforementioned function, the data recording and reproducing apparatus 10 according to the present embodiment, as shown in FIG. 1, has a control signal interface (hereinafter, the interface is represented by IF) 11, a control section 12, a data accumulation section 13, a data input IF 14 and a data output IF 15. These components are interconnected by an internal bus 31. The data recording and reproducing apparatus 10 is used as an AV server which deals with audio/visual data (AV data) in a broadcasting station or the like, and the AV server records and reproduces AV data or the like inputted from VCR (Video cassette recorder) 20 or the like under control by a server controller 30.

The server controller 30 transmits control signals $S_1$ and $S_2$ to the control signal IF 11 and controls the recording and reproduction operations of the data recording and reproducing apparatus 10. For example, when the server controller 30 requests the data recording and reproducing apparatus 10 to reproduce data, it transmits PLAY_OPEN command for requesting preparation of data reproduction as an input control signal $S_1$. Moreover, while data in an arbitrary file in the data accumulation section 13 are being reproduced, the server controller 30 changes management information as occasional demands so that areas where reproduced data of the on-reproducing data in the file have been recorded become recordable areas, and adds a release instruction for immediately releasing, whenever necessary, the areas where the data have been recorded (referred to as "occasional release instruction" throughout the present specification) to the PLAY_OPEN command so as to transmit it. Moreover, the server controller 30 controls the VCR 20 to input data $D_{IN}$ to be recorded into the data input IF 14. Here, in the case where, for example, the data recording and reproducing apparatus 10 is utilized in a broadcasting station or the like, the control signals $S_1$ and $S_2$ may be transmitted from the server controller 30 automatically according to a broadcasting program, or based on remote control through a remote controller (not shown) or the like connected with the server controller 30.

The data input IF 14 realizes the function of the data input means 45, and removes added data such as synchronized data inputted from the VCR 20 from the data $D_{IN}$ so as to make net data. Moreover, the data input IF 14 compresses data as occasional demands. The data inputted into the data input IF 14 are transmitted via the internal bus 31 to the data accumulation section 13 so as to be accumulated therein under the control by the control section 12.

The data accumulation section 13 realizes the function of the data accumulation means 43, and it records and stores data captured from the data input IF 14 therein. Moreover, the data accumulation section 13 reproduces the accumulated data so as to transmit them to the data output IF 15. The data accumulation section 13 is composed of a semiconductor memory directly connected with the internal bus 31, non-linear accessible HDD (hard disk drive) connected via an interface according to SCSI (Small Computer System Interface) standard or the like (for example, RAID (Redutant Arrays of Inexpensive Disks) which is combination of plural HDDs), and it can record and reproduce data.

The data output IF 15 realizes the function of the data output means 46, and it outputs data $D_{OUT}$, which are obtained by adding additional data, such as synchronizing signals, to net data accumulated by the data accumulation section 13. Moreover, the data output IF 15 expands net data as occasional demands.

The control signal IF 11 realizes the function of the control signal input means 41, and it transmits real-time control signals $S_1$ and $S_2$ from the server controller 30 to the control section 12.

The control section 12 realizes the functions of the server control means 42 and the file system management means 44, and it has a CPU (Central Processing Unit) 21, a ROM (Read Only Memory) 22 and a RAM (Random Access Memory) 23. The RAM 23 includes a work area 23a, a management information storage area 23b and a reproduction position storage area 23c as storage areas.

When the CPU 21 executes various programs stored in the ROM 22 using the work area 23a of the RAM 23, the control section 12 controls the respective components of the data recording and reproducing apparatus 10 so as to realize the functions of the server control means 42 and the file system management means 44. For example, the control section 12 controls the data input IF 14, the data accumulation section 13 and the data output IF 15 based on an external instruction from the control signal IF 11 and the management information stored in the management information storage area 23b of the RAM 23. As a result, the control section 12 records the data inputted from the data input IF 14 into desired areas (address) in the data accumulation section 13 and reads out the data in a specified file from the data accumulation section 13 so as to output the data from the data output IF 15. Moreover, the control section 12 creates management information to be stored in the management information storage area 23b. Here, the control section 12 controls the data accumulation section 13 to record and reproduce data per file unit as long as a special instruction is not given from outside.

Moreover, when the occasional release instruction is added to the PLAY_OPEN command from outside (server controller 30) for requesting preparation of data reproduction, the control section 12 as the file system management means 44 corrects (changes) the management information so that areas occupied by the reproduced data in the data recording areas occupied by on-reproducing file in the data accumulation section 13 become new data recordable areas whenever a file is reproduced. Moreover, when the occasional release instruction is added to the PLAY_OPEN command, the control section 12 as the server control means 42 writes reproduction position information of on-reproducing file in the data recording areas of the data accumulation section 13 into the reproduction position storage area 23c of the RAM 23 whenever a file is reproduced. In the case where, for example, the data accumulated in the data accumulation section 13 are AV data compressed according to the MPEG (Moving Picture Experts Group) standard, the writing of the reproduction position information is carried out per GOP (Group Of Pictures).

Furthermore, the CPU 21 stores the management information for managing recording areas in the data accumulation section 13 into the management information storage area 23b of the RAM 23 and manages it therein, so that the control section 12 realizes the function of the file system management means 44. The control section 12 as the file system management means 44 manages information about as to addresses in the data accumulation section 13 into which data have been recorded, space area information in the data accumulation section 13 and the like. The control section 12 as the file system management means 44 is actuated according to instructions for requesting "area information for file reproduction" and "space area information for file recording" from the server control means 42, and transmits information according to the instruction to the server control means 42.

In addition, when the server control means 42 has received the occasional release instruction, the control section 12 as the file system management means 44 successively reads the reproduction position information written into the reproduction position storage area 23c as the reproduction position transmission means 47 and changes the management information based on the read reproduction position information. As a result, the control section 12 changes reproduced data recording areas occupied by the reproduced data into new data recordable areas whenever a file is reproduced. In such a manner, when the file system management means 44 obtains the reproduction position information of the on-producing file via the reproduction position transmission means 47, the process for transmitting a reproduction position performed by the server control means 42 and the process for immediately releasing, whenever necessary, the areas where data have been recorded (referred to as "occasional release process" throughout the present specification) in a file based on the reproduction position information performed by the file system management means 44 can be executed asynchronously. Therefore, the occasional release process can be executed without influencing performance of the whole data recording and reproducing apparatus 10. Here, when the processes for reproduction position transmission in the file system management means 44 and the server control means 42 are executed asynchronously, real-time characteristic between the occasional release process and the reproduction operation is deteriorated. However, since it is not necessary that the occasional release process actually coincides with the reproduction operation completely, the deterioration of real-time characteristic can be neglected actually. Here, the process for changing the management information according to the occasional release instruction executed by the control section 12 as the file system management means 44 will be further detailed in the explanation of the operation, mentioned later.

The following will describe the management information which is managed in the file system management means 44 with reference to FIGS. 3 and 4.

Figure 3A:
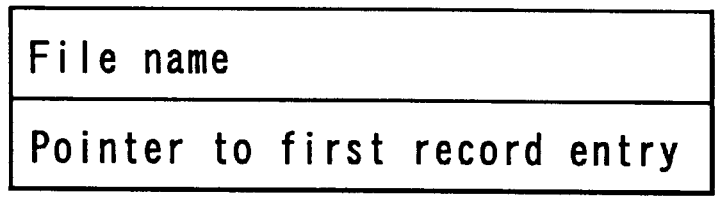
FIGS. 3A through 3C are explanatory diagrams showing one example of management information to be managed in the data recording and reproducing apparatus shown in FIG. 1.
Figure 3B:
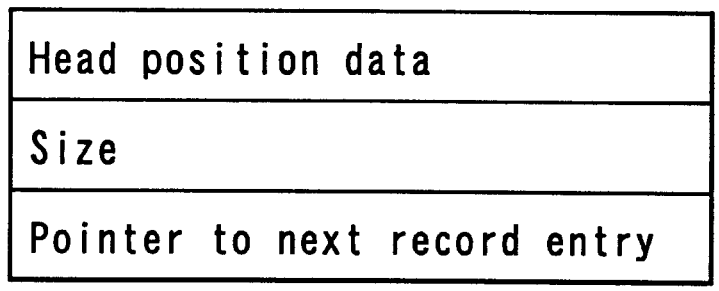
Figure 3C:
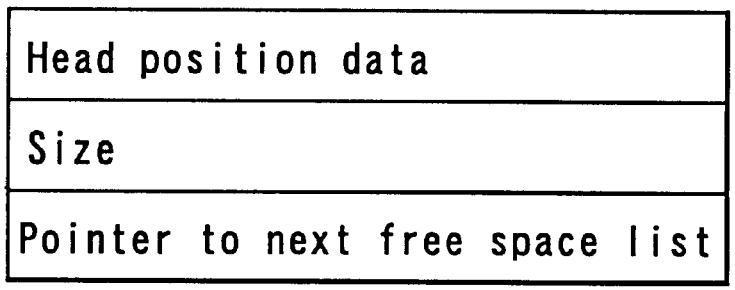

The management information is composed of, for example, file entry (FE) shown in FIG. 3A, record entry (RE) shown in FIG. 3B and free space list (FSL) shown in FIG. 3C. The file entry and the record entry of the management information are used for managing data recorded in the data accumulation means 43 (data accumulation section 13) per file unit, and they are linked with each other.

The file entry is composed of two items, namely, file names of recorded data and pointers for linking with the first record entry having the recording area information corresponding to the file names.

The record entry is used for showing areas in address space of the data accumulation means 43 where the data of the file name in the linked file entry are recorded. The record entry is composed of three items, namely, head position data representing an address of the head position of the areas where data have been recorded, size data representing a length (size) of the areas continuous with the address represented by the head position data, and a pointer to the record entry representing areas where next data in the same file have been recorded. In the case where all data included in one file are recorded in continuous areas in the address space of the data accumulation means 43, the record entry is made up independently. Moreover, in the case where data included in one file are divided into plural parts to be recorded in areas in the address space of the data accumulation means 43, the record entry is composed of plural record entry lists corresponding to the divided areas. In this case, plural record entries are linked successively by the item "pointer to next record entry". In the case where a record entry corresponding to the next area where data have been recorded does not exist, "EOF (End Of File)", which represents end of data included in one file is described in the item "pointer to next record entry".

The free space list represents information about space areas (free space: recordable areas including unused areas where data can be recorded) in the data accumulation means 43. The free space list is composed of three items, namely, head position data representing an address of a head position of space areas, size data representing a length of the space areas continuous with the address represented by the head position data, and a pointer representing a link destination of next space area in the free space list. In the case where the space area is a continuous area in the address space of the data accumulation means 43, the free space list is made up independently. Moreover, in the case where the space area is divided into plural areas in the address space of the data accumulation means 43, the free space list is composed of plural free space lists corresponding to the divided space areas. In this case, plural free space lists are linked successively by the item "pointer to next free space list". Here, in the case where the free space list corresponding to next space area does not exist, "EOL (End Of List)", which represents end of the space area included in the address space of the data accumulation means 43, is described in the item "pointer to next free space list".

The following will describe a particular use example of the management information shown in FIG. 3 with reference to FIG. 4. FIG. 4A shows the address space in the data accumulation means 43 (data accumulation section 13), and FIGS. 4B, 4C and 4D show the management information.

As shown in FIG. 4A, for example, the data in the file A are recorded continuously in one area of address 0 to 149 in the address space of the data accumulation means 43, and the data in the file B are recorded divisionally in two areas of address 200 to 299 and address 350 to 424. At this time, the space areas in the address space of the data accumulation means 43 is three-divided areas of address 150 to 199, address 300 to 349 and address 425 to 499. Here, in FIG. 4, the addresses are represented by number of a block which is a group of data with a predetermined unit.

The information corresponding to the area where the file A has been recorded in the area information shown in FIG. 4A is represented as shown in FIG. 4B by using file entry and the record entry shown in FIGS. 3A and 3B. Namely, "A" is described in the item of the file name in the file entry (FE). "0" and "150" are described respectively in the items of the head position data and the size data in the record entry (RE) linked by the pointer of the file entry. Moreover, "EOF", which represents end of data, is described in the item of the pointer to next record entry in the record entry.

The information corresponding to the areas where the file B has been recorded in the area information shown in FIG. 4A is represented as shown in FIG. 4C by using file entry and the record entry shown in FIGS. 3A and 3B. Namely, "B" is described in the item of the file name in the file entry (FE). "200" and "100" are described respectively in the items of the head position data and the size data in the record entry (RE-1) linked by the pointer of the file entry. Moreover, "350" and "75" are described respectively in the items of the head position data and the size data in the next record entry (RE-2) linked by the pointer of the record entry (RE-1). Moreover, "EOF" representing end of data is described in the item of the point to a record entry next to the record entry (RE-2).

The information corresponding to the space areas in the area information shown in FIG. 4A is represented as shown in FIG. 4D by using free space list shown in FIG. 3C.

Namely, "150" and "50" are described respectively in the items of the head position data and the size data in the first free space list (FSL-1). Moreover, "300" and "50" are described respectively in the items of the head position data and the size data in the next free space list (FSL-2) linked by the pointer of the free space list (FSL-1). Further, "425" and "75" are described respectively in the items of the head position data and the size data in a next free space list (FSL-3) linked by the pointer of the free space list (FSL-2). Moreover, "EOL" representing end of list is described in the item of the pointer to free space list next to the free space list (FSL-3).

The following will describe the operation of the data recording and reproducing apparatus 10 having the above constitution.

First, the description will refer to the operation in absence of the occasional release instruction.

Figure 5:
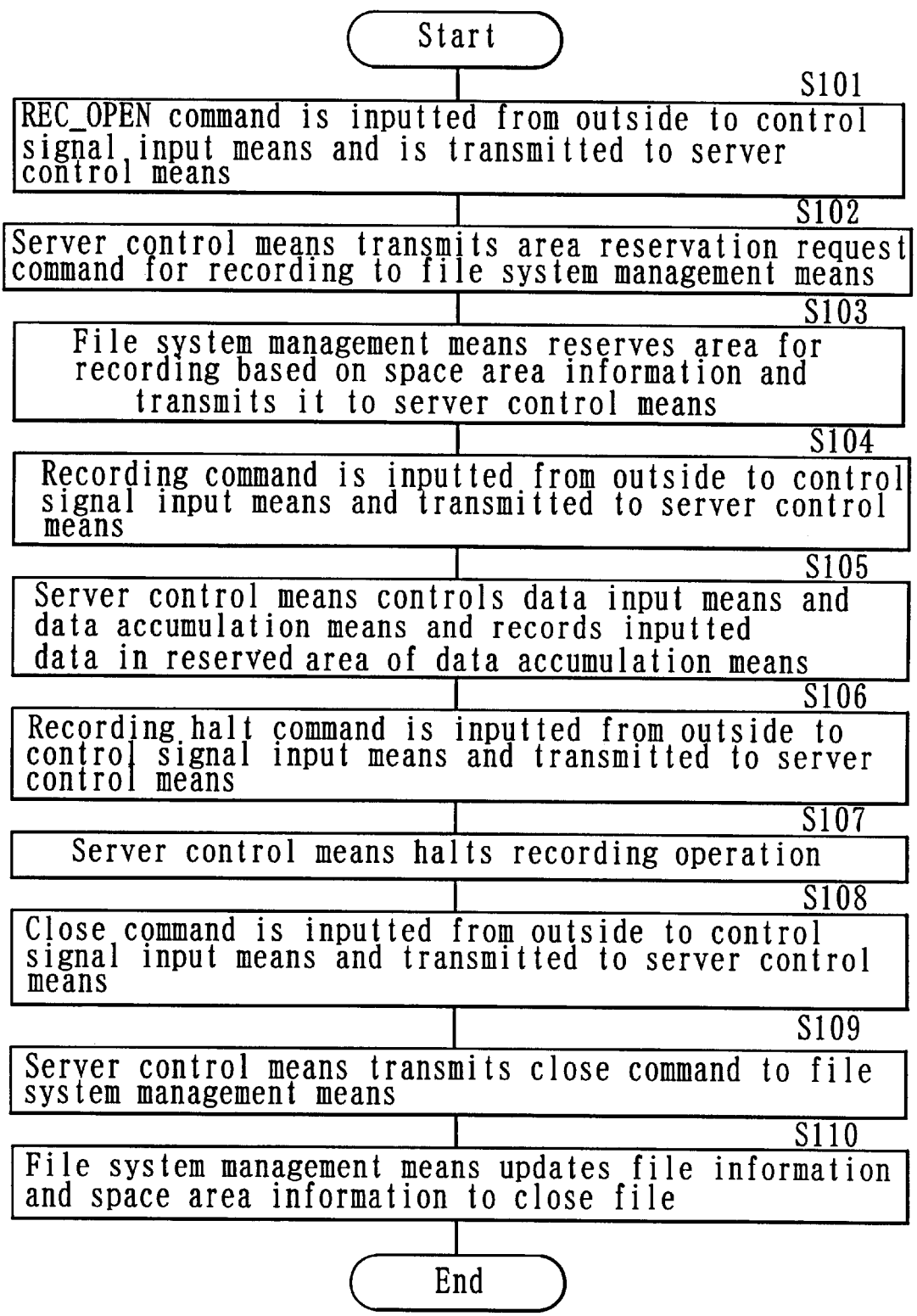
FIG. 5 is a flow chart for describing a recording operation of the data recording and reproducing apparatus shown in FIG. 1.

FIG. 5 is a flow chart for describing the data recording operation. First, when an instruction (REC_OPEN command) for requesting preparation of recording of data in a predetermined file (creation of file entry, or the like) is inputted as the input control signal $S_1$ from outside (server controller 30) into the control signal input means 41 (control signal IF 11), the control signal input means 41 transmits the signal $S_1$ to the server control means 42 (control section 12) (S101). Here, the signal Si inputted into the control signal input means 41 includes information of such as a file name and size of data to be recorded.

When the server control means 42 receives the REC_OPEN command for requesting preparation of data recording, it transmits an area reserve request instruction for reserving an area for data recording in the data accumulation means 43 (data accumulation section 13) to the file system management means 44 (S102). When the file system management means 44 receives the area reserve request instruction, it reserves an area for data recording based on the free space list which is data-recordable space area information included in the management information (FIG. 3) owned by itself (management information storage area 23b of the RAM 23), and transmits the reserved area information to the server control means 42 (S103).

Next, when a recording instruction for actually starting the data recording is inputted as the input control signal $S_1$ from outside (server controller 30) into the control signal input means 41, the control signal input means 41 transmits the signal $S_1$ to the server control means 42 (S104). Upon receiving the recording instruction, the server control means 42 controls the data input means 45 and the data accumulation means 43 so as to record data $D_{IN}$ to be recorded, which has been inputted from outside (VCR 20) via the data input means 45, into the reserved area of the data accumulation means 43 and to accumulate the data $D_{IN}$ therein (S105).

Next, when a recording halt instruction for halting data recording is inputted as the input control signal $S_1$ from outside (server controller 30) into the control signal input means 41, the control signal input means 41 transmits the signal $S_1$ to the server control means 42 (S106). Upon receiving the recording halt instruction, the server control means 42 controls the data accumulation means 43 so as to halt the data recording operation (S107).

Next, a close instruction, which is for closing the file after correcting (updating) the management information owned by the file system management means 44, is inputted as the input control signal $S_1$ from outside (server controller 30) into the control signal input means 41, and the signal $S_1$ is transmitted to the server control means 42 (S108). Upon receiving the close instruction, the server control means 42 transmits the close instruction to the file system management means 44 (S109). Upon receiving the close instruction, the file system management means 44 updates the management information (FIG. 3) owned by itself and closes the file (S110). As a result, the recording operation is terminated. Here, in the file system management means 44, as the file closing process, for example, a difference between the first reserved area for data recording and the area where the data have been actually recorded is adjusted.

Figure 6:
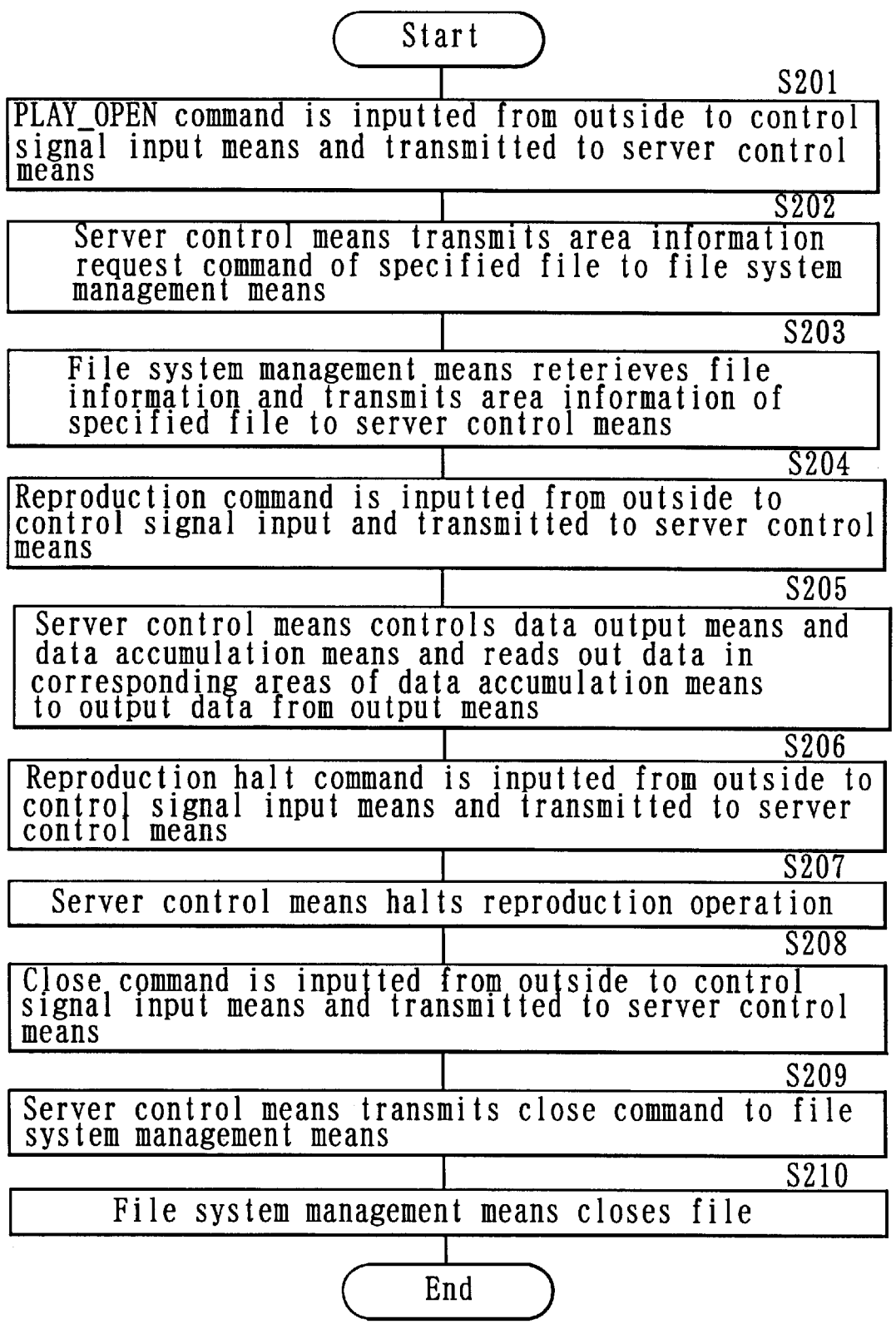
FIG. 6 is a flow chart for describing a reproduction operation of the data recording and reproducing apparatus shown in FIG. 1.

The following will describe the data reproduction operation with reference to FIG. 6. When an instruction (PLAY_OPEN command) for requesting preparation of reproduction of data in a predetermined file is inputted as the output control signal $S_2$ from outside (server controller 30) into the control signal input means 41 (control signal IF 11), the control signal input means 41 transmits the signal $S_2$ to the server control means 42 (control section 12) (S201). Here, the signal $S_2$ to be inputted to the control signal input means 41 includes information about a file name or the like for specifying the data to be reproduced.

Upon receiving the PLAY_OPEN command for requesting preparation of data reproduction, the server control means 42 transmits an area information request instruction which requests information representing an area of the data accumulation means 43 (data accumulation section 13) where the data in the predetermined data have been recorded, to the file system management means 44 (S202). Upon receiving the area information request instruction, the file system management means 44 retrieves the information about the area where the data in the specified data have been recorded based on the management information (FIG. 3) owned by itself (management information storage area 23b of the RAM 23), and transmits the retrieved area information to the server control means 42 (S203).

Next, when a reproduction instruction for actually starting the data reproduction is inputted as the output control signal $S_2$ from outside (server controller 30) into the control signal input means 41, the control signal input means 41 transmits the signal $S_2$ to the server control means 42 (S204). Upon receiving the reproduction instruction, the server control means 42 controls the data output means 46 (data output IF 15) and the data accumulation means 43 so as to reproduce data in a specified file from the data accumulation means 43 based on the area information obtained from the file system management means 44 and to output the reproduced data as data $D_{OUT}$ from the data output means 46 (S205).

Next, when a reproduction halt instruction for halting data reproduction is inputted as the output control signal $S_2$ from outside (server controller 30) into the control signal input means 41, the control signal input means 41 transmits the signal $S_2$ to the server control means 42 (S206). Upon receiving the reproduction halt instruction, the server control means 42 controls the data accumulation means 43 so as to halt the data reproduction operation (S207).

Next, a close instruction for terminating the file process is inputted as the output control signal $S_2$ from outside (server controller 30) into the control signal input means 41, and the signal $S_2$ is transmitted to the server control means 42 (S208). Upon receiving the close instruction, the server control means 42 transmits the close instruction to the file system management means 44 (S209). Upon receiving the close instruction, the file system management means 44 closes the file (S210) so that the reproduction operation is terminated.

The following will describe an example of the operation of the data recording and reproducing apparatus 10 involving recording of plural data with reference to FIGS. 7 through 9. Here, the description will be given as to the case where the file A whose data amount is 40 minutes and the file B whose data amount is 30 minutes are recorded in the data accumulation means 43 (data accumulation section 13) whose data recording capacity is 60 minutes. In addition, there considers the case where first all the areas for data recording in the data accumulation means 43 are free, and the file A and the file B are recorded in this order in the data accumulation means 43 in the free state, and the recorded data are reproduced one by one.

Figures 7A, 7B:
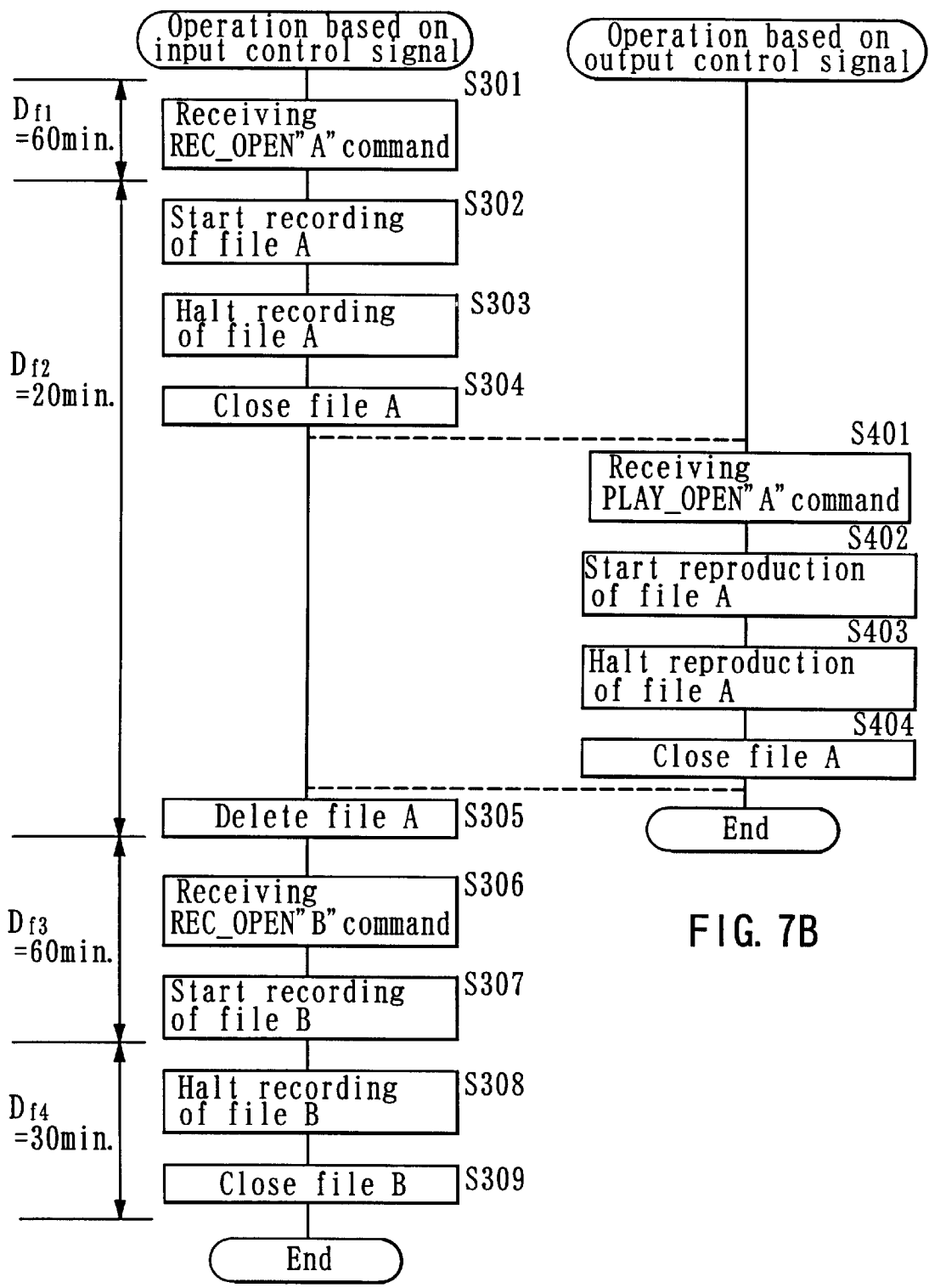
FIGS. 7A and 7B are explanatory diagrams showing examples of the operations based on control signals in the data recording and reproducing apparatus shown in FIG. 1.

FIG. 7 is an explanatory diagram showing the operation of the data recording and reproducing apparatus 10 in the case where the file A and the file B are recorded and reproduced. FIG. 7A shows the operation based on the input control signal $S_1$, and FIG. 7B shows the operation based on the output control signal $S_2$. FIG. 8 shows a change in areas for data recording in the data accumulation means 43 (data accumulation section 13) according to the operations shown in FIG. 7. FIG. 9 shows a change in the management information owned by the file system management means 44 according to the operations shown in FIG. 7. Here, in FIGS. 8 and 9, for convenience, address coincides with "minute".

Figure 8A:
FIGS. 8A through 8D are explanatory diagrams showing a change in recording areas according to the operations shown in FIGS. 7A and 7B.
Figure 9A:
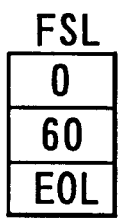
FIGS. 9A through 9D are explanatory diagrams showing a change in the management information according to the operations shown in FIGS. 7A and 7B.

First, as shown in FIG. 7A, the data recording and reproducing apparatus 10 receives an instruction (REC_OPEN "A" command) for requesting preparation of recording of the file A as the input control signal $S_1$ from outside (server controller 30) (S301). At this time, as shown in FIG. 8A, all the areas for data recording in the data accumulation means 43 are free, and a recordable data amount $D_{f1}$ is 60 minutes in time. Moreover, the management information owned by the file system management means 44 at this time is represented as shown in FIG. 9A by using free space lists (FSL) shown in FIG. 3. Namely, "0" and "60" are described respectively in the items of the head position data and the size data, and "EOL" representing end of list is described in the item of the pointer to next free space list.

Figure 8B:
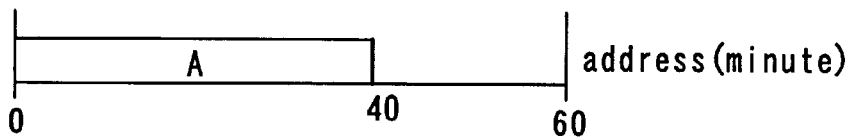
Figure 9B:
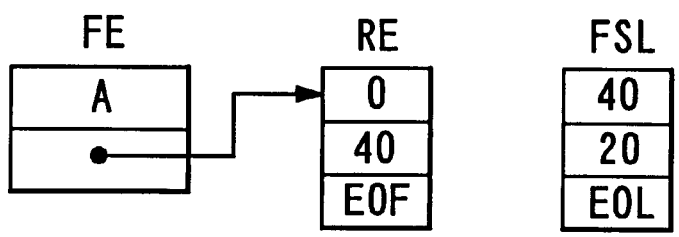

Upon receiving the REC_OPEN "A" command, the data recording and reproducing apparatus 10 reserves an area for recording the file A only by 40 minutes based on the management information owned by the file system management means 44 as shown in FIG. 8B. At this time, the file system management means 44 of the data recording and reproducing apparatus 10 corrects (updates) the management information according to the reservation of the area for recording the file A. The corrected management information is as shown in FIG. 9B. When the management information is corrected in such a manner, an amount $D_{f2}$ of data except for the file A to be recordable in the data accumulation means 43 becomes 20 minutes in time.

The information of the management information shown in FIG. 9B corresponding to the area for recording the file A is represented by file entry (FE) and record entry (RE). Namely, "A" is described in the item of the file name in the file entry, and "0" and "40" are described respectively in the items of the head position data and the size data in the record entry linked with the file entry. Moreover, "EOF" representing end of data is described in the item of the pointer to next record entry. Moreover, "40" and "20" are described respectively in the items of the head position data and the size data in the free space list showing the space areas, and "EOL" representing end of list is described in the item of the pointer to next free space list.

The data recording and reproducing apparatus 10 receives the REC_OPEN "A" command and reserves the area for recording the file A and corrects the management information. Thereafter, upon receiving from outside (server controller 30) the recording instruction for actually starting the recording of the file A, the data recording and reproducing apparatus 10 starts the recording of the data in the file A into the reserved area of the data accumulation means 43 (S302).

Next, upon receiving from outside (server controller 30) the recording halt instruction for halting the recording of the file A, the data recording and reproducing apparatus 10 halts the operation for recording the file A (S303).

In addition, upon receiving the close instruction from outside (server controller 30), the data recording and reproducing apparatus 10 corrects (updates) the management information owned by the file system management means 44 so as to close the file (S304). Here, in the file system management means 44, as the file close process, there exists a difference between the management information created first by the server control means 42 and the area where the data have been actually recorded, the difference is adjusted. Here, the file A is recorded in accordance with the management information first created as shown in FIG. 8B.

As mentioned above, when the file A is recorded, as shown in FIG. 8B, the area in the data accumulation means 43 occupied by the file A is 40 minutes, and the recordable area where another data can be recorded is 20 minutes. Therefore, at this time the file B whose data amount is 30 minutes cannot be recorded. Accordingly, after the file A is reproduced, it is necessary to delete the whole reproduced file so as to create a space area.

As shown in FIG. 7B, in the case where the file A is reproduced, the data recording and reproducing apparatus 10 receives the instruction for requesting the preparation of file A reproduction (PLAY_OPEN "A" command) as the output control signal $S_2$ from outside (server controller 30) (S401).

Upon receiving the PLAY_OPEN "A" command, the data recording and reproducing apparatus 10 retrieves the area information for reproducing the file A based on the management information owned by the file system management means 44. Next, upon receiving from outside (server controller 30) the reproduction instruction for actually starting the reproduction of the file A, the data recording and reproducing apparatus 10 starts reproduction of the data in the file A from the data accumulation means 43 based on the retrieved area information (S402).

Next, upon receiving from outside (server controller 30) the reproduction halt instruction for halting reproduction of the file A, the data recording and reproducing apparatus 10 halts the reproduction of the file A (S403).

In addition, upon receiving the close instruction from outside (server controller 30), the data recording and reproducing apparatus 10 closes the file (S404), and ends the reproduction operation of the file A.

Figure 8C:
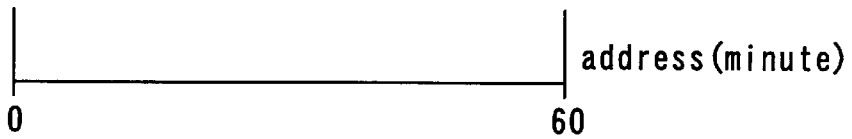
Figure 9C:
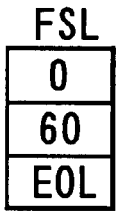

Next, as shown in FIG. 7A, upon receiving a file A deleting instruction from outside (server controller 30) after the reproduction process of the file A is ended, the data recording and reproducing apparatus 10 deletes the whole reproduced file A from the data accumulation means 43 (S305). At this time, the area for data recording in the data accumulation means 43 is, as shown in FIG. 8C, free, and a recordable data amount $D_{f3}$ is 60 minutes in time. Therefore, the file B of 30 minutes can be recorded at this time. Moreover, the file system management means 44 of the data recording and reproducing apparatus 10 corrects (updates) the management information according to the deletion of file A. The corrected management information is, as shown in FIG. 9C, represented only by free space list, and "0" and "60" are described respectively in the items of the head position data and the size data in the free space list. Moreover, "EOL" representing end of list is described in the item of the pointer to the next free space list.

Next, the data recording and reproducing apparatus 10 receives the instruction for requesting the preparation of recording the file B (REC_OPEN "B" command) as the input control signal $S_1$ from outside (server controller 30) (S306).

Figure 8D:
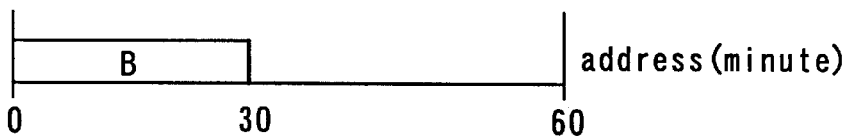
Figure 9D:
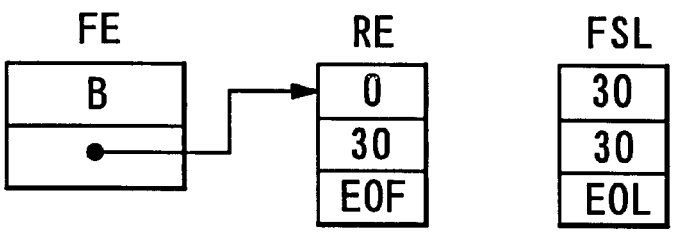

Upon receiving the REC_OPEN "B" command, the data recording and reproducing apparatus 10 reserves an area for recording the file B by 30 minutes, for example, as shown in FIG. 8D, based on the management information owned by the file system management means 44. At this time, the data recording and reproducing apparatus 10 corrects (updates) the management information according to the reservation of the area for recording the file B. The corrected management information is as shown in FIG. 9D. When the management information is corrected in such a manner, a data amount $D_{f4}$ in the data accumulation means 43 where data except for those in the file B can be recorded is 30 minutes in time.

The information corresponding to the area for recording the file B in the management information shown in FIG. 9D is represented by file entry (FE) and record entry (RE). Namely, "B" is described in the item of the file name in the file entry, and "0" and "30" are described respectively in the items of the head position data and the size data in the record entry linked with the file entry. Moreover, "EOF" representing end of data is described in the item of the pointer to the next record entry. Moreover, "30" and "30" are described respectively in the items of the head position data and the size data in the free space list representing a space area, and "EOL" representing end of list is described in the item of the pointer to the next free space list.

After receiving the REC_OPEN "B" command, reserving the area for recording the file B and correcting the management information, when the data recording and reproducing apparatus 10 has received from outside (server controller 30) a recording instruction for actually starting the recording of the file B, it starts the recording of the data in the file B into the reserved area of the data accumulation means 43 (S307).

Next, upon receiving from outside (server controller 30) the recording halt instruction for halting the recording of the file B, the data recording and reproducing apparatus 10 halts the operation for recording the file B (S308).

In addition, upon receiving the close instruction from outside (server controller 30), the data recording and reproducing apparatus 10 corrects (updates) the management information owned by the file system management means 44 and closes the file (S309), and ends the process for recording the file A and the file B.

The file A and the file B are recorded and reproduced in the above manner. In these processes, since the recordable area (completely space area) of 20 minutes and the area of 10 minutes where the file A has been reproduced make the area of 30 minutes at the time when the file A is reproduced for 10 minutes, from the time when the file A is reproduced for 10 minutes, sufficient space area for recording the file B is generated in the data accumulation means 43 (data accumulation section 13), and thus the file B can be properly recorded. Therefore, in the present embodiment, in the case where the occasional release instruction is added to the PLAY_OPEN command from outside (server controller 30) for requesting preparation of data reproduction, the management information is changed so that the reproduced data recording area occupied by the reproduced data in the data recording area occupied by the on-reproducing file may become a recordable area where new data can be recorded.

The following will describe the operation including a process according to the occasional release instruction.

As mentioned above, the occasional release instruction is added to the REC_OPEN command for preparing data reproduction. When the occasional release instruction is added, the reproduced data are successively deleted (released) from the recording area in the data accumulation section 13. The following detailed operation of the occasional release instruction will be given as to the REC_OPEN process for transmitting the recording instruction from the server controller 30 to the data recording and reproducing apparatus 10 when data are reproduced while the recording area is being released at any time in the data recording and reproducing apparatus 10. Next, the description will be given as to the processes in the server control means 42 and in the file system management means 44 when they receive the reproduction instruction (PLAY_OPEN command) including the occasional release instruction.

Figure 10:
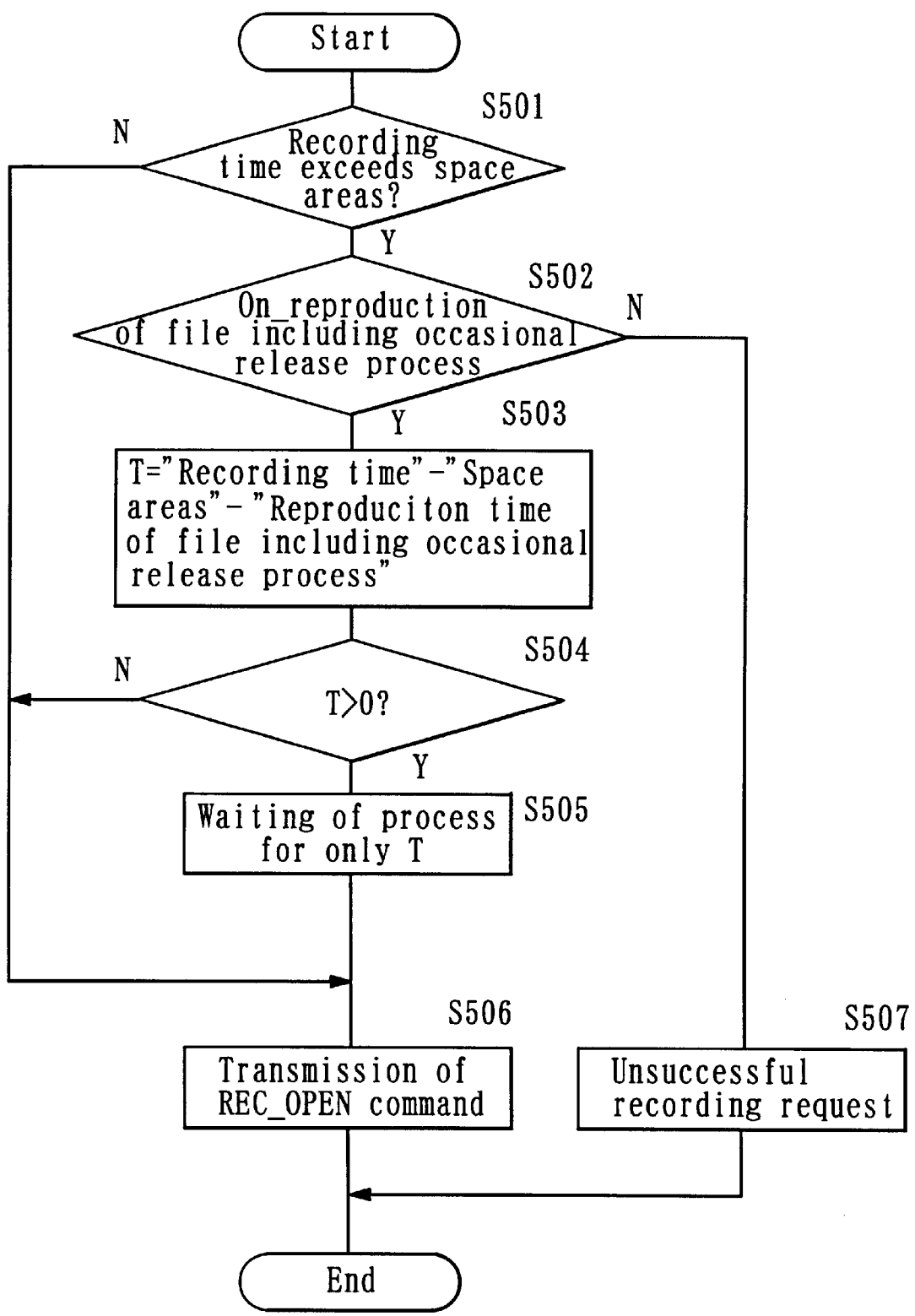
FIG. 10 is a flow chart showing a transmission operation of the control signals in the case where the data recording and reproducing apparatus shown in FIG. 1 performs a process according to an occasional release instruction.

First, with reference to FIG. 10, the description will be given as to the operation that the server controller 30 transmits the REC_OPEN command for requesting the preparation of data recording to the data recording and reproducing apparatus 10 in the case where the data recording and reproducing apparatus 10 accompanies the process according to the occasional release instruction. In the case where the server controller 30 transmits the REC_OPEN command, first the server controller 30 judges as to whether or not a data amount (recording time) of a file to be recorded exceeds the space area in the data recording and reproducing apparatus 10 (S501). When the data amount does not exceed the space area in the data recording and reproducing apparatus 10 (S501;N), the server controller 30 transmits the REC_OPEN command to the data recording and reproducing apparatus 10 (S506), and ends the process.

Meanwhile, when the data amount exceeds the space area in the data recording and reproducing apparatus 10 (S501;Y), the server controller 30 judges as to whether or not the data accumulation means 43 (data accumulation section 13) is reproducing a file for which an occasional release process is to be performed in the data recording and reproducing apparatus 10 (S502). Here, when the file is reproduced without the occasional release process in the data recording and reproducing apparatus 10 (S502;N), the server controller 30 judges that the recording request is unsuccessful (S507) and ends the process.

In addition, in the case where the data recording and reproducing apparatus 10 is performing a file reproduction including the occasional release process (S502;Y), the server controller 30 subtracts the space area in the data accumulation means 43 and the time for file reproduction including the occasional release process from the data amount (recording time) of the file to be recorded (S503). Next, the server controller 30 judges as to whether or not the obtained value T exceeds 0, namely, the recording area for the file to be recorded is reserved (S504). Here, all the recording time, the space area and the time for file reproduction including the occasional release process are grasped by the server controller 30.

When the calculated value T does not exceed 0, namely, the recording area to be recorded has been already reserved (S504;N), the server controller 30 transmits the REC_OPEN command to the data recording and reproducing apparatus 10 (S506), and ends the process. Moreover, when the calculated value T exceeds 0, namely, the recording area to be recorded has not been reserved (S504;Y), the server controller 30 waits until the time corresponding to the calculated value T passes (S505), and thereafter transmits the REC_OPEN command to the data recording and reproducing apparatus 10 (S506) so as to end the process.

Figure 11:
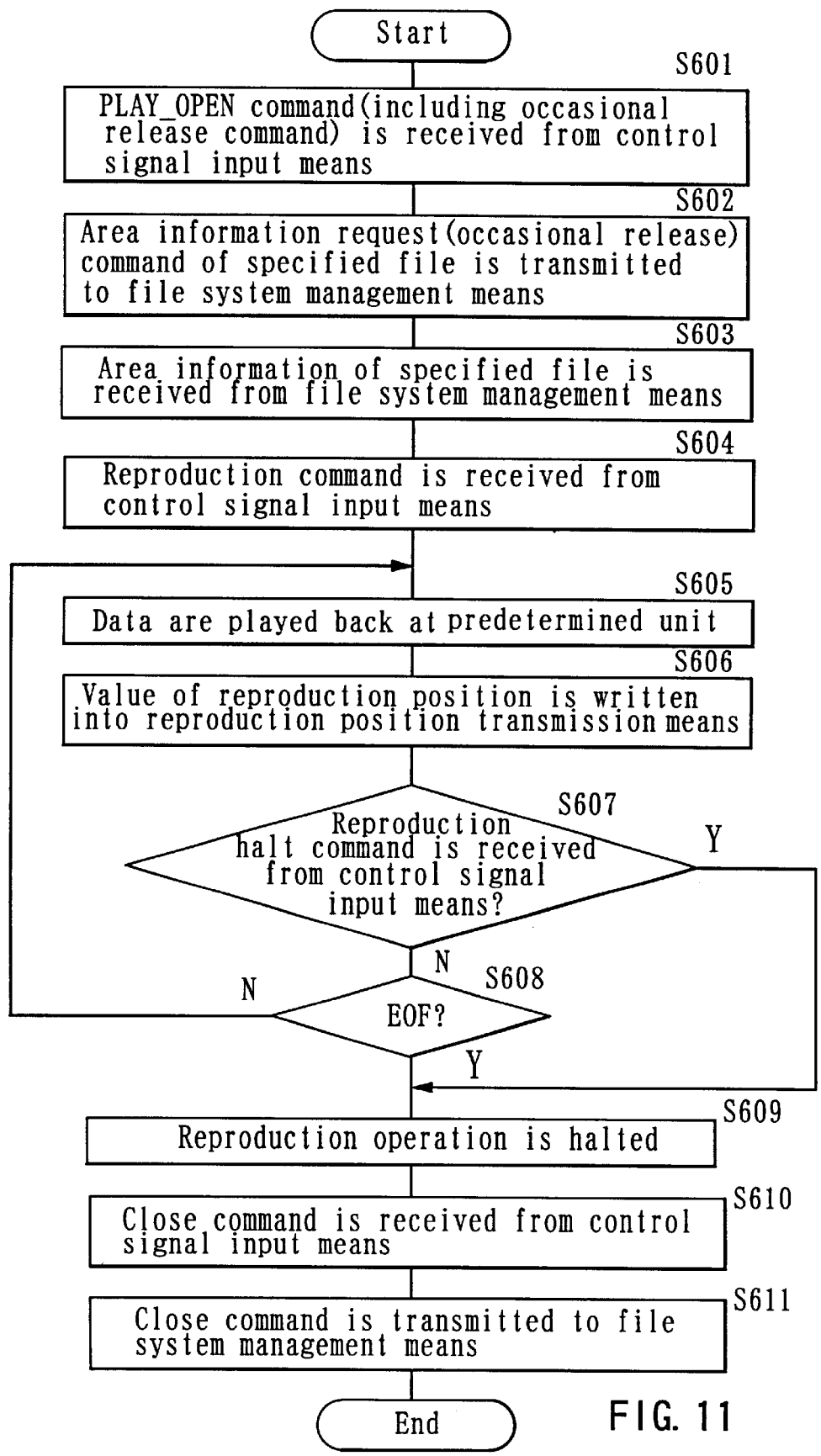
FIG. 11 is a flow chart for explaining an operation to be performed in the case where server control means of the data recording and reproducing apparatus shown in FIG. 1 performs an occasional release process.
Figure 12:
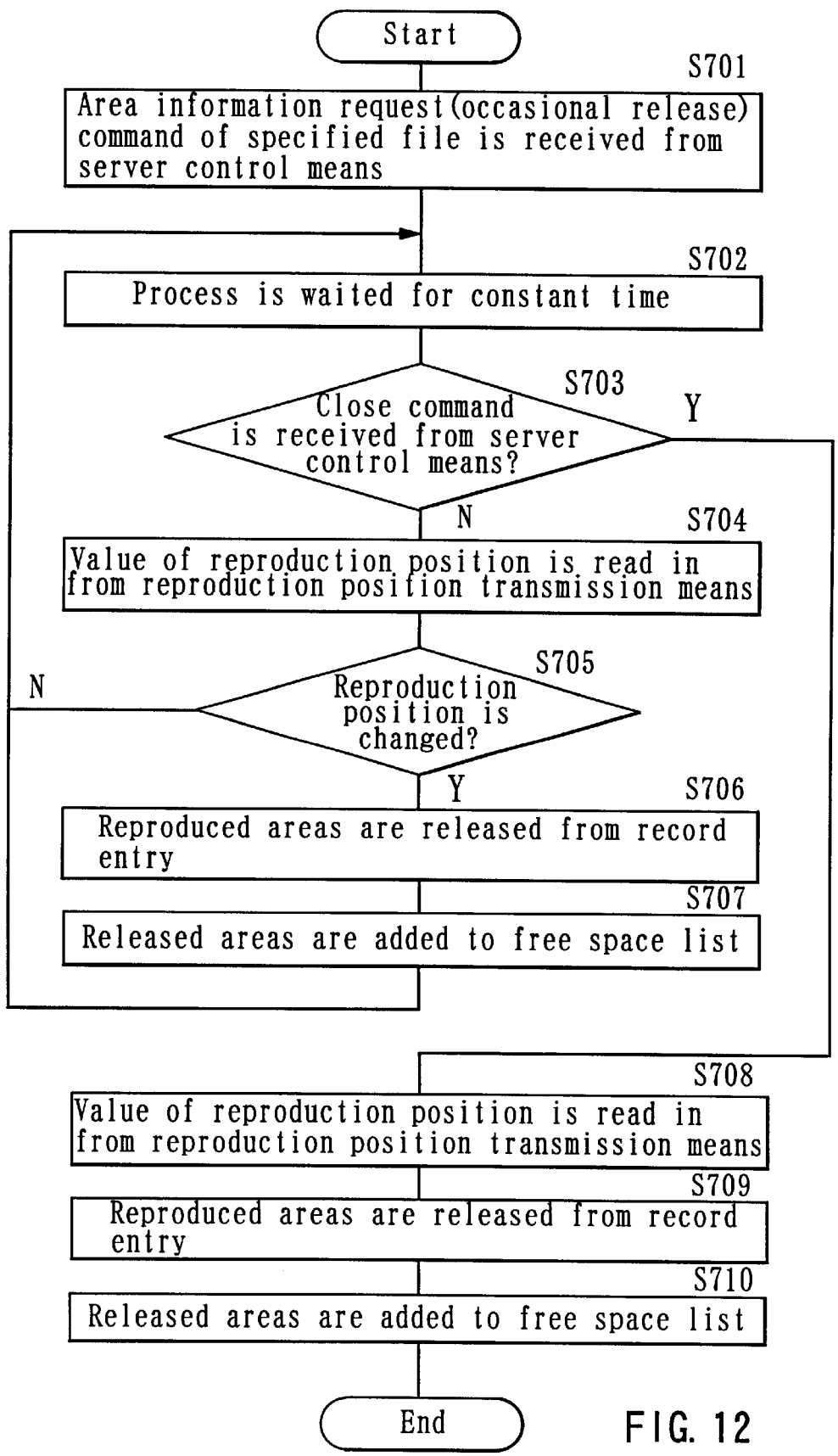
FIG. 12 is a flow chart for explaining an operation in the case where file system management means of the data recording and reproducing apparatus shown in FIG. 1 performs the occasional release process.

The following will describe the operation performed by the data recording and reproducing apparatus 10 when it has received the occasional release instruction with reference to FIGS. 11 and 12. The description of this operation will be divided into two parts, the operation by the server control means 42 and the operation by the file system management means 44.

FIG. 11 is a flow chart showing the operation including the occasional release process in the server control means 42 (control section 12). As shown in this diagram, when the server control means 42 has received the PLAY_OPEN command for requesting preparation of reproduction of data in a predetermined file including the occasional release instruction, from outside (server controller 30) via the control signal input means 41 (control signal IF 11) (S601), the server control means 42 transmits an area information request instruction for requesting information representing areas in the data accumulation means 43 (data accumulation section 13) where the data in the specified file are recorded to the file system management means 44 (S602). Here, the area information request instruction to be transmitted to the file system management means 44 includes the occasional release instruction.

Next, the server control means 42 receives area information where the data in the specified file have been recorded transmitted from the file system management means 44 according to the area information request instruction (S603). After receiving the area information about the specified file, the server control means 42 receives the reproduction instruction for actually starting the data reproduction from outside (server controller 30) via the control signal input means 41. Next, the server control means 42 controls the data output means 46 (data output IF 15) and the data accumulation means 43, and reproduces the data in the specified file from the data accumulation means 43 based on the area information obtained from the file system management means 44 so as to output the data as data $D_{OUT}$ from the data output means 46.

Next, when the data in the specified file in the data accumulation means 43 are reproduced by a predetermined unit (S605), the server control means 42 writes a value of the reproduction position in the data recording area for the on-reproducing file into the reproduction position transmission means 47 (reproduction position storage area 23c of RAM 23) (S606). Here, the data by a predetermined unit are data by 1 GOP unit, for example, when the data are data compressed according to the MPEG standard. Therefore, after the data are reproduced by 1 GOP unit, the reproduction position is written in the reproduction position transmission means 47.

Next, the server control means 42 judges as to whether or not the reproduction halt instruction for halting the data reproduction has been received from outside (server controller 30) via the control signal input means 41 (S607). In the case where the reproduction halt instruction has not been received (S607;N), the server control means 42 judges as to whether or not the data in the on-producing file have reached the End Of File (EOF) (S608). In the case where the data in the on-reproducing file have not reached the EOF (S608;N), the procedure returns to S605 so that the process is repeated.

In addition, when the reproduction halt instruction has been received (S607;Y) or the data in the on-reproducing file have reached the EOF (S608;Y), the server control means 42 controls the data accumulation means 43 so as to halt the operation for reproducing the data (S609). Next, upon receiving the close instruction from outside (server controller 30) via the control signal input means 41 (S610), the server control means 42 transmits the close instruction to the file system management means 44 (S611) so as to end the process including the occasional release instruction.

FIG. 12 is a flow chart for describing the operation including the occasional release process in the file system management means 44. As shown in this diagram, when the occasional release process is accompanied, the file system management means 44 first receives the area information request instruction, which includes the above-mentioned occasional release instruction and requests the area information representing an area in the data accumulation means 43 (data accumulation section 13) where the data in a specified file have been recorded, from the server control means 42 (S701). Then, after the process is waited for constant time (S702), the file system management means 44 judges as to whether or not the close instruction has been received from the server control means 42 (S703). Here, the process is waited for constant time at S702 in order to prevent useless process to be executed by the CPU 21 composing the file system management means 44. When the process is waited for constant time, the CPU 21 can execute another process. Here, in the case where the data accumulated in the data accumulation means 43 are, for example, AV data compressed according to the MPEG standard, the waiting time is set for at least a value longer than the data reproduction time of 1 GOP. More specifically, the waiting time is set for about 1 second, for example.

In the case where the file system management means 44 has not received the close instruction from the server control means 42 (S703;N), it reads in the value of the reproduction position of the on-producing file written by the server control means 42 from the reproduction position transmission means 47 (the reproduction position storage area 23c of the RAM 23) (S704). The file system management means 44 compares the read value of the reproduction position with the management information owned by itself (the management information storage area 23b of the RAM 23) in order to judge as to whether or not the reproduction position of the specified file has changed according to the occasional release instruction (S705). Here, if the reproduction position of the file has not changed (S705;N), the file system management means 44 repeats the process from S702.

In addition, if the reproduction position of the specified file has changed according to the occasional release instruction (S705;Y), the file system management means 44 releases the area in the record entry where the data have been reproduced representing the recording area corresponding to the change in the reproduction position of the on-reproducing data in the management information about the specified file (S706). After the released area is added to the free space list (S707) and the management information has been changed, the process from S702 is repeated.

In addition, upon receiving the close instruction from the server control means 42 (S703;Y), the file system management means 44 reads a value of the reproduction position of the on-producing file written by the server control means 42 from the reproduction position transmission means 47 (S708). Then, the file system management means 44 releases the reproduced area in the record entry representing recording area corresponding to the reproduction position of the on-producing data in the management information about the specified file (S709). After the system management means 44 adds the released area to the free space list (S710) and updates the management information, it ends the process including the occasional release instruction. As mentioned above, the management information is changed immediately according to the change in the reproduction position of the on-producing file according to the occasional release instruction, and the reproduced area is released.

The following will particularly describe the sequence of changing the management information accompanied by the occasional release instruction, namely, the above-mentioned file entry, record entry and free space list with reference to FIGS. 13 and 14. FIG. 13 is an explanatory diagram showing one example of a change in the recording area in the data accumulation means 43 (data accumulation section 13), when the occasional release instruction is given. FIG. 14 is an explanatory diagram showing a change in the management information owned by the file system management means 44 to be written according to the occasional release instruction in the example shown in FIG. 13. Here, in FIGS. 13 and 14, for convenience, address coincides with "minute".

As shown in FIG. 13A, for example, before reproduction of a file under the occasional release instruction, in an address space of the data accumulation means 43 whose total capacity is 100 minutes, the data in the file A are divided into three parts and recorded in address 10 to 24 (15 minutes), address 30 to 54 (25 minutes) and address 60 to 79 (20 minutes). As this time, the space areas are areas which are divided into four, namely, address 0 to 9 (10 minutes), address 25 to 29 (5 minutes), address 55 to 59 (5 minutes) and address 80 to 99 (20 minutes).

The area information shown in FIG. 13A is represented by the management information shown in FIG. 14A. First, the information corresponding to the areas where the file A is recorded is represented by file entry and record entry. Namely, "A" is described in the item of the file name of the file entry (FE), and "10" and "15" are described respectively in the items of the head position data and the size data in the record entry (RE-1) linked with the file entry. Moreover, "30" and "25" are described respectively in the items of the head position data and the size data in the next record entry (RE-2) linked by the pointer of the record entry (RE-1). Further, "60" and "20" are described respectively in the items of the head position data and the size data of the next record entry (RE-3) linked by the pointer of the record entry (RE-2). Moreover, "EOF" representing end of data is described in the item of the pointer to record entry next to the record entry (RE-3).

In addition, the information corresponding to the space areas is represented by free space list. Namely, "0" and "10" are described respectively in the items of the head position data and the size data in the first free space list (FSL-1). Moreover, "25" and "5" are described respectively in the items of the head position data and the size data (length) in the next free space list (FSL-2) linked by the pointer of the free space list (FSL-1). Further, "55" and "5" are described respectively in the items of the head position data and the size data in the next free space list (FSL-3) linked by the pointer of the free space list (FSL-2). Furthermore, "80" and "20" are described respectively in the items of the head position data and the size data in the next free space list (FSL-4) linked by the pointer of the free space list (FSL-3). Moreover, "EOL" representing end of list is described in the item of the pointer to free space list next to the free space list (FSL-4).

If the file A recorded as shown in FIG. 13A is reproduced by $\Delta T$ in time according to the file reproduction including the occasional release instruction, data areas corresponding to $\Delta T$ are partially released.

FIG. 13B shows a state of the recording area when the data are reproduced for 5 minutes, namely, the data are reproduced from address 10 which is a head of the file A to the address 15 (5 minutes). The management information at this time is as shown in FIG. 14B.

When the data area corresponding to the time $\Delta T$ (5 minutes) is released according to the occasional release instruction, the management information shown in FIG. 14A is changed into the management information shown in FIG. 14B, namely, the items of the head position data and the size data in the record entry (RE-1) are respectively changed into "15" and "10". Moreover, as for free space list, the item of the size in the free space list (FSL-1) is changed from "10" into "15". As a result, it is found that the size of the space area represented by the free space list (FSL-1) is increased by time $\Delta T$ (5 minutes).

The following will describe an example of the operation of the data recording and reproducing apparatus 10 when the occasional release instruction is executed during recording of plural files with reference to FIGS. 15 through 17. Here, the description will be given as to the case where the file A whose data amount is 40 minutes and the file B whose data amount is 30 minutes are recorded in the data accumulation means 43 (data accumulation section 13) whose data recording capacity is 60 minutes. Here, there considers the case where all the recording areas in the data accumulation means 43 are free, and data in the file A and the file B are recorded in this order in the data accumulation means 43 in the free state, and the recorded data are reproduced one by one.

Figures 15A, 15B:
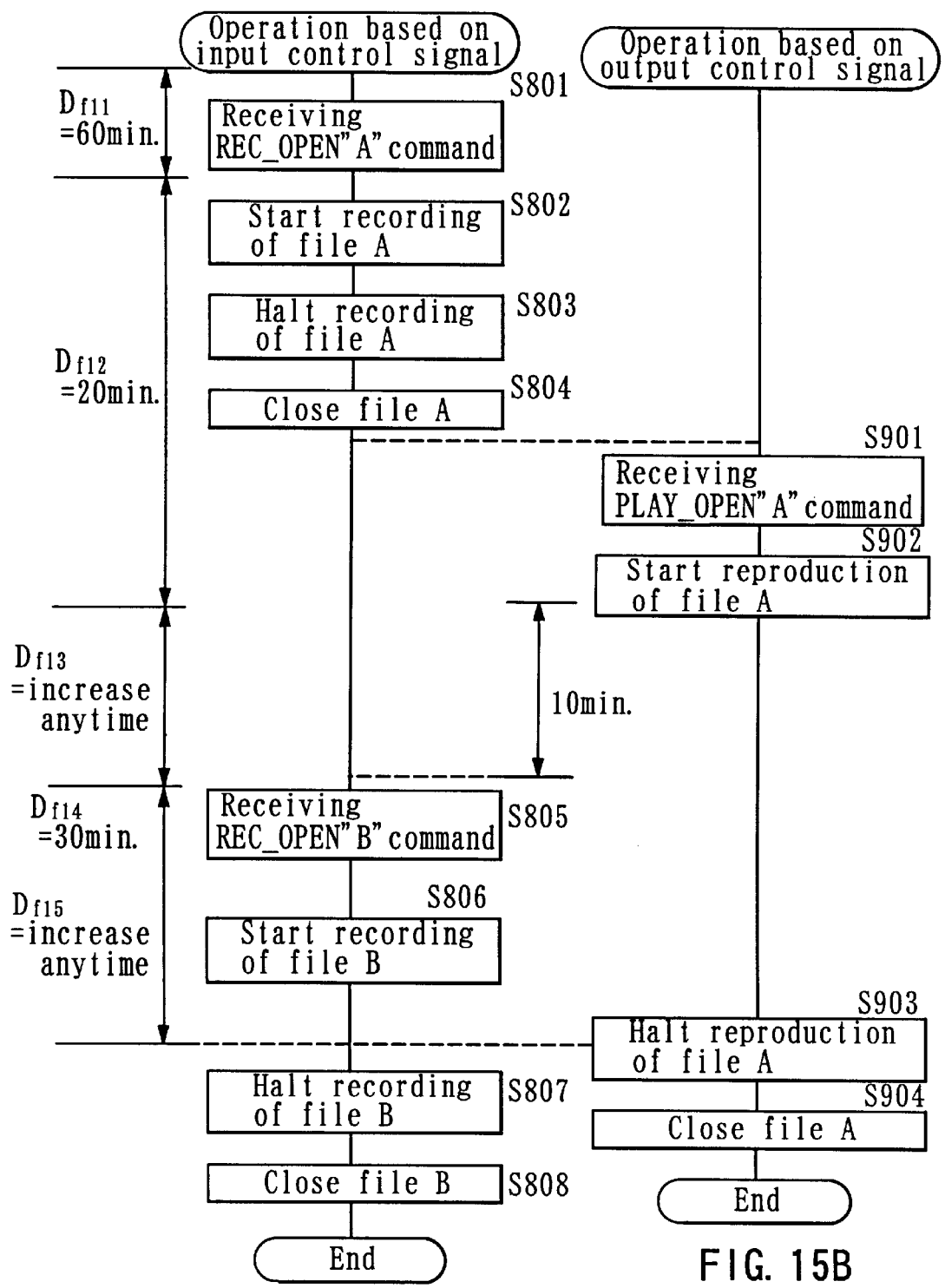
FIGS. 15A and 15B are explanatory diagrams showing examples of the operation which is performed by the data recording and reproducing apparatus shown in FIG. 1 based on the control signals including the occasional release instruction.

FIG. 15 shows the operation of the data recording and reproducing apparatus 10 when the file A and the file B are recorded and reproduced in such a manner. FIG. 15A shows the operation based on the input control signal $S_1$ which is a control signal for recording data, and FIG. 15B shows the operation based on the output control signal $S_2$ which is a control signal for reproducing data. FIG. 16 shows a change in an area for data recording in the data accumulation means 43 (data accumulation section 13) during the operations shown in FIG. 15. FIG. 17 shows a change in the management information owned by the file system management means 44 during the operations shown in FIG. 15. Here, in FIGS. 16 and 17, for convenience, address coincides with "minute".

Figure 16A:
FIGS. 16A through 16E are explanatory diagrams showing a change in the recording areas according to the operations shown in FIG. 15.
Figure 17A:
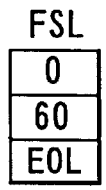
FIG. 17A through 17E diagrams explanatory showing a change in the management information according to the operations shown in FIG. 15.

First, as shown in FIG. 15A, the data recording and reproducing apparatus 10 receives the instruction (REC_OPEN "A" command) for requesting preparation of recording of the file A as the input control signal $S_1$ from outside (server controller 30) (S801). At this time, the area for data recording in the data accumulation means 43 is, as shown in FIG. 16A, free, and a recordable data amount $D_{f11}$ is 60 minutes in time. Moreover, the management information owned by the file system management means 44 at this time is represented as shown in FIG. 17A by using the free space list (FSL) shown in FIG. 3C. Namely, "0" and "60" are described respectively in the items of the head position data and the size data, and "EOL" representing end of list is described in the item of the pointer to the next free space list.

Figure 16B:
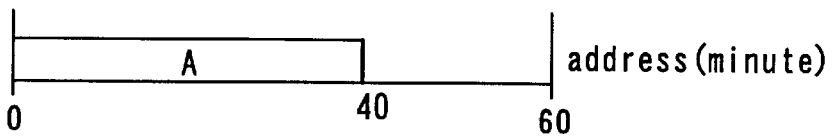
Figure 17B:
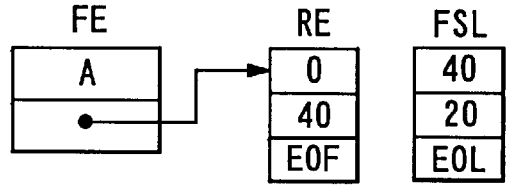

Upon receiving the REC_OPEN "A" command, the data recording and reproducing apparatus 10 reserves the recording area for recording the file A by 40 minutes as shown in FIG. 16B based on the management information owned by the file system management means 44. At this time, the file system management means 44 of the data recording and reproducing apparatus 10 corrects (changes) the management information to reserve the area for recording the file A. The corrected management information is as shown in FIG. 17B. When the management information is corrected in such a manner, an amount $D_{f12}$ of data, which can be recorded in the data accumulation means 43 except for the data in the file A, becomes 20 minutes in time.

The information corresponding to the area for recording file A in the management information shown in FIG. 17B is represented by using file entry (FE) and record entry (RE). Namely, "A" is described in the item of the file name in the file entry, and "0" and "40" are described respectively in the items of the head position data and the size data in the record entry linked with the file entry. Moreover, "EOF" representing end of data is described in the item of the pointer to the next record entry. Further, "40" and "20" are described respectively in the items of the head position data and the size data in the free space list representing space areas, and "EOL" representing end of list is described in the item of the pointer to the next free space list.

After the data recording and reproducing apparatus 10 has received REC_OPEN "A" command, reserved the area for recording the file A and corrected the management information, it receives from outside (server controller 30) the recording instruction for actually starting recording of the file A, and starts the recording of the data in the file A in the reserved area of the data accumulation means 43 (S802).

Next, upon receiving the recording halt instruction for halting the recording of the file A from outside (server controller 30), the data recording and reproducing apparatus 10 halts the operation for recording the file A (S803).

In addition, upon receiving the close instruction from outside (server controller 30), the data recording and reproducing apparatus 10 corrects (updates) the management information owned by the file system management means 44 and closes the file (S804). Here, in the file system management means 44, in the case where there exists a difference between the management information first created by the server control means 42 and a state of the recording area where the data have been actually recorded, the difference is adjusted as the process for closing file. Here, the file A is recorded as shown in FIG. 16B according to the first created management information.

When the file A is recorded as mentioned above, as shown in FIG. 16B, the area occupied by the file A in the data accumulation means 43 is 40 minutes, the recordable area where another data can be recorded is 20 minutes. Therefore, at this time, the file B whose data amount is 30 minutes cannot be recorded. Accordingly, while the process for releasing the reproduced data portion at any time is being executed, recording of the file B is started after the process for reproducing the file A is executed for at least 10 minutes,.

As shown in FIG. 15B, in the case where the data recording and reproducing apparatus 10 reproduces the file A, it receives the instruction (PLAY_OPEN "A" command), which includes the occasional release instruction and requests preparation of reproduction of the file A, as the output control signal $S_2$ from outside (server controller 30) (S901).

Upon receiving the PLAY_OPEN "A" command including the occasional release instruction, the data recording and reproducing apparatus 10 retrieves the area information for reproducing the file A based on the management information owned by the file system management means 44. Upon receiving the reproduction instruction for actually starting the reproduction of the file A from outside (server controller 30), the data recording and reproducing apparatus 10 starts the reproduction of the data in the file A from the data accumulation means 43 based on the retrieved area information (S902).

Figure 16C:
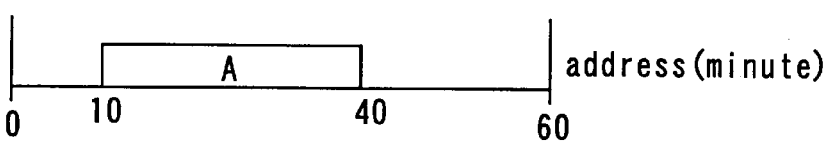

In addition, the data recording and reproducing apparatus 10 changes the management information whenever the data in the file A are reproduced so that the reproduced data recording area occupied by the reproduced data in the file A becomes an area where new data can be recorded. When the operation for reproducing the file A including the occasional release process is started, an amount $D_{f13}$ of data which can be recorded in the data accumulation means 43 is increased at any time. For example, after the file A is reproduced for 10 minutes, the recording area in the data accumulation means 43 is as shown in FIG. 16C. Namely, the area of address 0 to 9 is released, and data recordable area is created newly. As a result, in addition to the space area of address 40 to 59, a recordable data amount $D_{f14}$ becomes 30 minutes in time. Therefore, at this time, the file B of 30 minutes can be recorded.

Figure 17C:
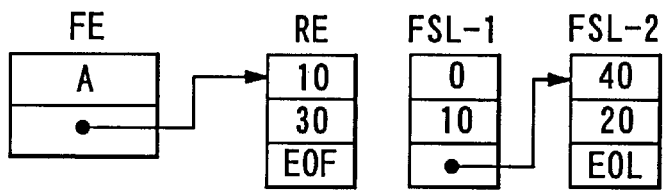

FIG. 17C shows the management information which is created after the file A is reproduced for 10 minutes. After the file A is reproduced for 10 minutes as shown in this diagram, the management information, in which the items of the head position data and the size data in the record entry corresponding to the recording area of the file A are changed respectively into "10" and "30", is created.

Moreover, as the free space list representing space areas, two lists, namely, FSL-1 and FSL-2 are created. "0" and "10" are described respectively in the items of the head position data and the size data in the free space list (FSL-1). Further, "40" and "20" are described respectively in the items of the head position data and the size data in the next free space list (FSL-2) linked by the pointer of the free space list (FSL-1), and "EOL" representing end of list is described in the item of the pointer to the next free space list.

Next, upon receiving the reproduction halt instruction for halting the reproduction of the file A from outside (server controller 30), the data recording and reproducing apparatus 10 halts the operation for reproducing the file A including the occasional release process (S903). Increase in an amount $D_{f15}$ of data to be recordable in the data accumulation means 43 is stopped by the halt of the reproduction operation.

In addition, upon receiving the close instruction from outside (server controller 30), the data recording and reproducing apparatus 10 closes the file A (S904), and ends the process for reproducing the file A.

Meanwhile, the data recording and reproducing apparatus 10 starts the reproduction of the file A at S902, and reproduces the file A for 10 minutes. After the amount $D_{f13}$ of data to be recordable in the data accumulation means 43 becomes 30 minutes (=$D_{f14}$) in time, the data recording and reproducing apparatus 10 receives the instruction for requesting preparation of recording of the file B (REC_OPEN "B" command) as the input control signal $S_1$ from outside (server controller 30) (S805).

Figure 16D:
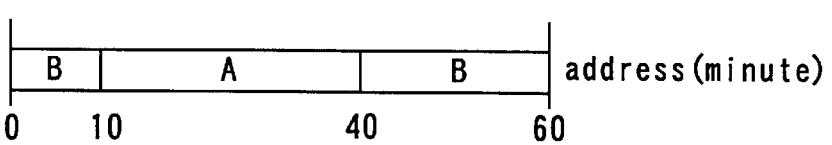
Figure 17D:
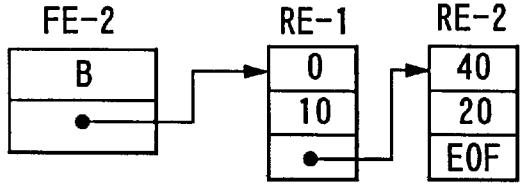

Upon receiving the REC_OPEN "B" command, the data recording and reproducing apparatus 10 reserves an area for recording the file B by 30 minutes as shown in FIG. 16D based on the management information owned by the file system management means 44. At this time, the data recording and reproducing apparatus 10 corrects (changes) the management information according to the reservation of the area for recording the file B. The corrected management information is as shown in FIG. 17D. When the management information is corrected in such a manner, an amount of data to be recordable in the data accumulation means 43 which has been increased anytime is temporarily decreased to 0 minute by the data amount of the file B according to the operation for reproducing the file A. Thereafter, the data amount is again increased anytime so that a recordable data amount become $D_{f15}$.

The management information shown in FIG. 17D is composed of information corresponding to the areas for recording the file A and the file B and the information about space areas. The information corresponding to the area for recording the file A is represented by the file entry (FE-1) and one record entry (RE). The record entry (RE) of the file A is the same as that in FIG. 17C. Meanwhile, the information corresponding to the area for recording the file B is represented by the file entry (FE-2) and two record entries (RE-1 and RE-2). "B" is described in the item of the file name in the file entry (FE-2), and "0" and "10" are described respectively in the items of the head position data and the size data in the record entry (RE-1) linked with the file entry (FE-2). Moreover, "40" and "20" are described respectively in the items of the head position data and the size data (length) in the record entry (RE-2) next to the record entry (RE-1), and "EOF" representing end of data is described in the item of the pointer to the record entry next to the record entry (RE-2). Further, "0" and "0" are described respectively in the items of the head position data and the size data in the free space list representing space areas, and "EOL" representing end of list is described in the item of the pointer to the next free space list.

The data recording and reproducing apparatus 10 receives the REC_OPEN "B" command, and reserves the area for recording the file B and corrects the management information. Thereafter, upon receiving from outside (server controller 30) the recording instruction for actually starting the recording of the file B, the data recording and reproducing apparatus 10 starts the recording of the data in the file B in the reserved area of the data accumulation means 43 (S806).

Next, upon receiving the recording halt instruction for halting the recording of the file B from outside (server controller 30), the data recording and reproducing apparatus 10 halts the operation for recording the file B (S807).

In addition, upon receiving the close instruction from outside (server controller 30), the data recording and reproducing apparatus 10 corrects (updates) the management information about the file B owned by the file system management means 44 so as to close the file B (S809), and ends the process for recording the file B.

Figure 16E:
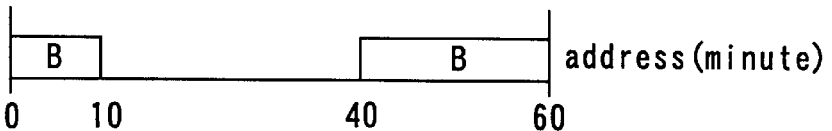
Figure 17E:
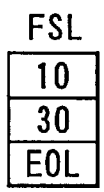

FIGS. 16E and 17E show the recording areas in the data accumulation means 43 and the management information owned by the file system management means 44 after the reproduction of the file A and the recording of the file B are ended. As shown in FIG. 16E, when the reproduction of the file A and the recording of the file B are ended, the file B is recorded in the area of address 0 to 9 and the area of address 40 to 59 in the data accumulation means 43, and the area of address 10 to 39 becomes free. In the management information at this time, as shown in FIG. 17E, the file entry (RE-1) and one record entry (RE) corresponding to the recording area of the file A are deleted from the management information in FIG. 17D. Moreover, the items of the head position data and the size data in the free space list representing space areas are changed into "10" and "30" respectively.

Since the area where the file A has been reproduced is released anytime while the file A is reproduced in the above-mentioned manner, even before the whole file A is reproduced and deleted, the file B can be recorded.

Figure 18A:
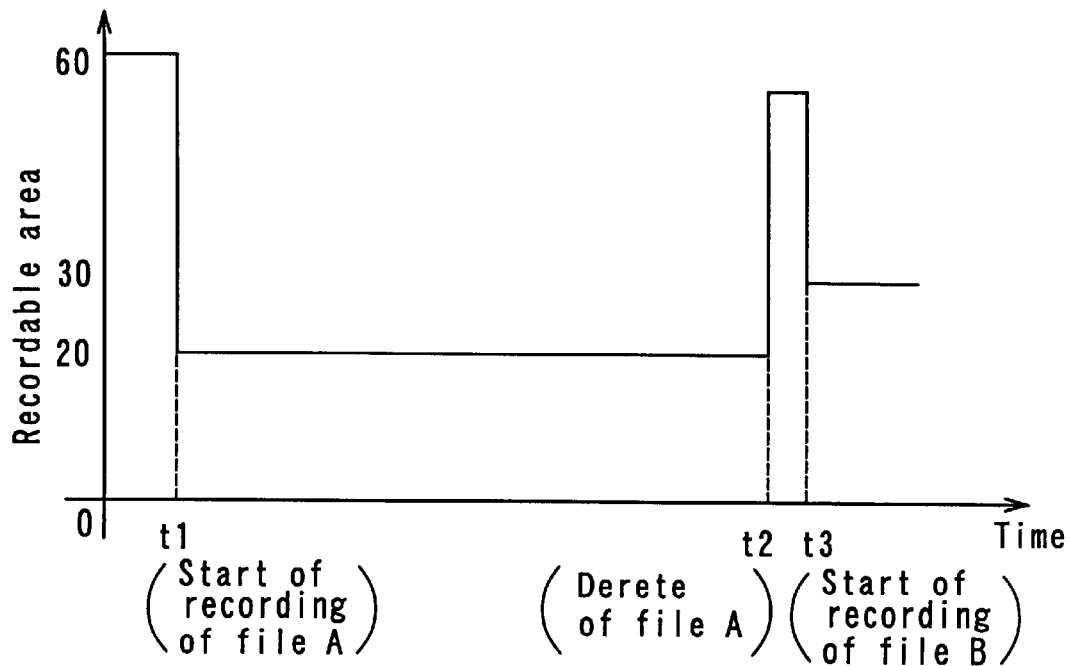
FIGS. 18A and 18B are explanatory diagrams for comparing changes in the recordable areas in the operations shown in FIGS. 7A and 7B and the operations shown in FIGS. 15A and 15B.
Figure 18B:
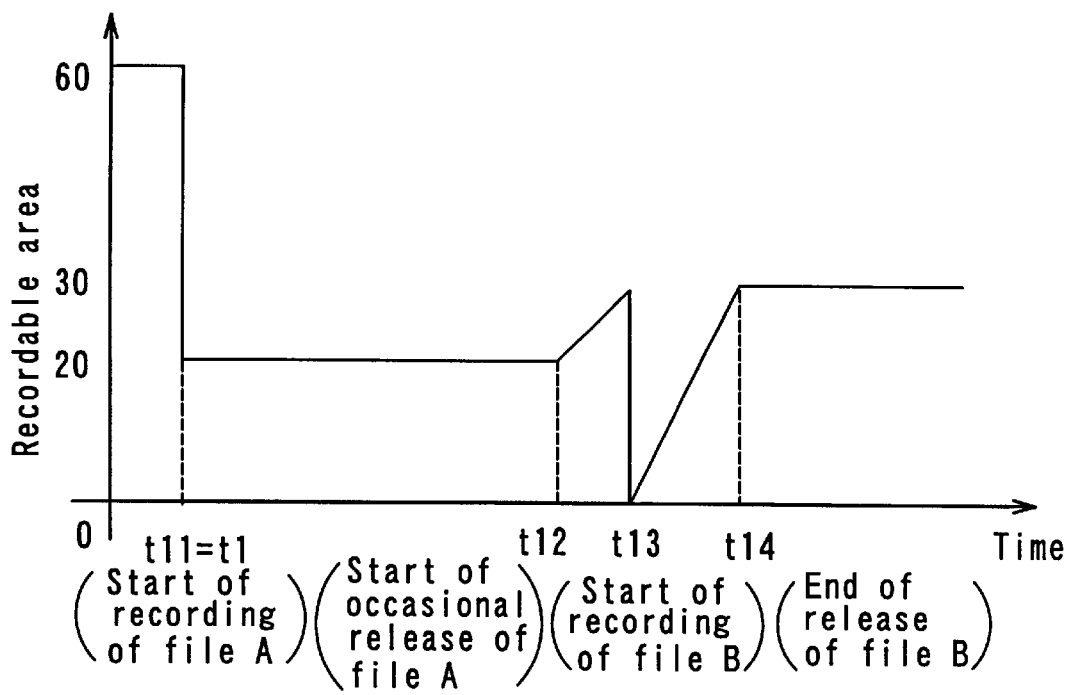

FIGS. 18A and 18B show an explanatory diagram for comparing changes in the recordable area in the operation shown in FIG. 7 and the operation shown in FIG. 15. Namely, FIG. 18A shows a change in the recordable area according to the I/O control signals which do not include the occasional release instruction, and FIG. 18B shows a change in the recordable area according to the I/O control signals which include the A occasional release instruction. In FIGS. 18A and 18B, the vertical axis represents the recordable area and the horizontal axis represents time.

As shown in FIG. 18A, at the time of the operation in absence of the occasional release instruction, when the recording of the file A is started ($t_1$), the recordable area becomes 20 minutes in time. Next, after the recording of the file A is ended, when the whole file A is reproduced and deleted ($t_2$), the recordable area becomes 60 minutes. When the recording of the file B is started ($t_3$), the recordable area becomes 30 minutes.

Meanwhile, as shown in FIG. 18B, in the operation under the occasional release instruction, in the case where the operation shown in FIG. 15, including the occasional release process in file A, the recordable area becomes 20 minutes in time when the recording of the file A is started ($t_{11}=t_1$). Next, after the recording of the file A is ended, when the reproduction of the file A including the occasional release process is started ($t_{12}$), the recordable area is increased anytime. Ten minutes after starting reproduction of the file A, the recordable area becomes 30 minutes. At this point of time, if the recording of the file B is started ($t_{13}$), then the recordable area becomes 0 minute. However, while the occasional release process for the file A is being continued, the recordable area is increased anytime. The increase in the recordable area is stopped simultaneously with the end of the occasional release process for the file A ($t_{14}$). In the operation shown in FIG. 15 including the occasional release process for the file A, it is found that the recordable area in the data accumulation means 43 (data accumulation section 13) is used efficiently. Moreover, as is clear from comparison of the starting times of the recording of the file B $t_3$ and $t_{13}$ in FIG. 18, in the operation including the occasional release process for the file A, the starting time $t_{13}$ of the recording of the file B is earlier than the time $t_3$. This is because the file B becomes recordable at the time when the reproduction process for the file A including the occasional release process is executed for 10 minutes, even if reproduction of the whole file A is not completed. As is clear from this, the total data recording time is shortened by generating the occasional release instruction.

As described above, in the data recording and reproducing apparatus 10 according to the present embodiment, management information is changed anytime according to the occasional release instruction from outside (server controller 30) added to the PLAY_OPEN command for requesting preparation of reproduction of data so that the area where the reproduced data of the data in an arbitrary file have been recorded may become recordable while the data are being reproduced. For this reason, before the reproduction of the on-reproducing file is completed, new data can be recorded in the area occupied by the reproduced data, and thus the area for data recording in the data accumulation means 43 (data accumulation section 13) can be utilized efficiently. As a result, for example when plural data are recorded, a trouble such that the data cannot be recorded because of less recordable area can be decreased. Moreover, the data recording time required for recording plural data can be shortened.

The present invention is not limited to the aforementioned embodiment, and can be variously modified. For example, the present invention is not limited to using as an AV server which treats with audio/visual data, and thus can be applied also to an apparatus to be used for recording and reproducing the other kinds of data.

In addition, the above embodiment described the case where the reproduction position transmission means 47 is provided, but the occasional release process may be executed without providing the reproduction position transmission means 47. In this case, transmission of the reproduction position under the occasional release process is performed as a command from the server control means 42 directly to the file system management means 44 in real time. As a result, the process for releasing reproduced data recording area can be executed in real time.

In addition, the occasional release process may not be executed according to the occasional release instruction from the server controller 30, but may be always executed for all the files to be reproduced.

The following will describe second embodiment. Here, in the following description, the same parts as the components in the first embodiment are noted by the same reference numerals, and the description thereof is omitted.

The above-mentioned first embodiment described the example that when data are reproduced from the data recording and reproducing apparatus 10, the reproduced data are released anytime from the recording area so that the storage efficiency is improved. However, the present embodiment will describe an example in detail that when data are reproduced, a recording area is released according to an instruction from outside.

In the present embodiment, the server controller 30 in FIG. 1 transmits an instruction, which releases a data recording area so that an area occupied by reproduced data of an area in the data accumulation section 13 occupied by the on-reproducing data is changed into an area where new data can be recorded, (hereinafter, such instruction is referred to as a release instruction) as the input control signal $S_1$.

Upon receiving the release instruction, the control section 12 of the data recording and reproducing apparatus 10 corrects management information stored in the management information recording area 23b so that the area where the data have been reproduced of the on-reproducing data area becomes a recordable area, and releases the recording area so that new data can be recorded.

The following will describe a process for transmitting the release instruction for releasing a data area by the server controller 30 to the data recording and reproducing apparatus 10, and the description will be detailed as to the process to be executed by the data recording and reproducing apparatus 10 which has received the release instruction or the like, on the server controller 30.

Figure 19:
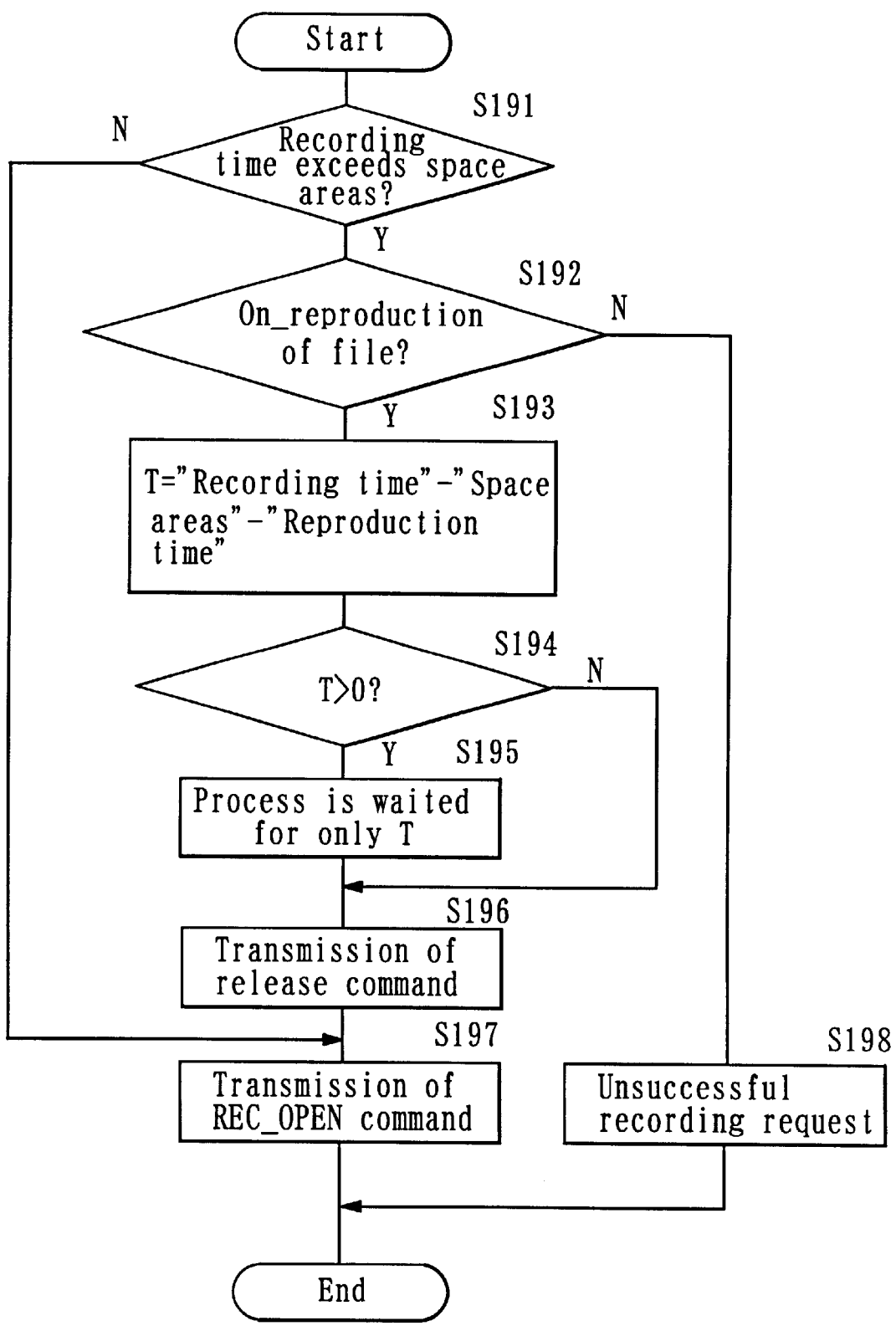
FIG. 19 is a flow chart showing an operation in the case where the control signal including the release instruction is transmitted from outside to the data recording and reproducing apparatus shown in FIG. 1.

FIG. 19 is a flow chart showing the process for transmitting the release instruction to the data recording and reproducing apparatus 10. More specifically, when data are being reproduced in the data accumulation section 13 of the data recording and reproducing apparatus 10, before the REC__OPEN command which is a file recording preparation instruction is transmitted, the release instruction is transmitted so that the area is released. The description will be given below following the sequence.

First, when this process is started, a judgment is made as to whether or not an amount of data in a file to be recorded (recording time) exceeds a space area in the data recording and reproducing apparatus 10 (S191). When the data amount does not exceed the space area in the data recording and reproducing apparatus 10 (S191;N), the data accumulation section 13 has capacity where data can be recorded. Therefore, the server controller 30 transmits the REC__OPEN command which is the file recording preparation instruction directly to the data recording and reproducing apparatus 10 (S197).

Meanwhile, when the data amount exceeds the space area in the data recording and reproducing apparatus 10 (S191;Y), the server controller 30 judges as to whether or not the file accumulated in the data accumulation means 43 (data accumulation section 13) is being reproduced in the data recording and reproducing apparatus 10 (S192). When the file is not being reproduced in the data recording and reproducing apparatus 10 (S192;N), the server controller 30 judges that the recording request is unsuccessful (S198), and ends the process.

In addition, when the data recording and reproducing apparatus 10 is reproducing the file (S192;Y), the server controller 30 subtracts a space area in the data accumulation means 43 and the time required for reproducing the on-reproducing file from an amount of the data in the file to be recorded (recording time) (S193). Next, the server controller 30 judges as to whether or not the obtained value T exceeds 0(S194). Namely, the server controller 30 judges as to whether or not the recording area of the file to be recorded is reserved in the data accumulation means 43. Here, all the recording time, the space area and the time required for reproducing the on-reproducing file are grasped by the server controller 30.

When the calculated value T does not exceed 0 (S194;N), namely the recording area of the file to be recorded has been already reserved in the data accumulation means 43, the server controller 30 transmits the release instruction to the data recording and reproducing apparatus 10 (S196) so as to immediately release the recording area of the on-producing data. Then, the server controller 30 transmits the REC__OPEN command for preparing the recording of the file to the data recording and reproducing apparatus 10 (S197).

Meanwhile, when the calculated value T exceeds 0 (S194;Y), the area for the file to be recorded is not reserved. Therefore, the server controller 30 waits until the time corresponding to the calculated value T passes (S195), and generates the aforementioned release instruction (S196) so as to transmit the REC__OPEN command to the data recording and reproducing apparatus 10 (S197). As a result, this process is ended.

Figure 20:
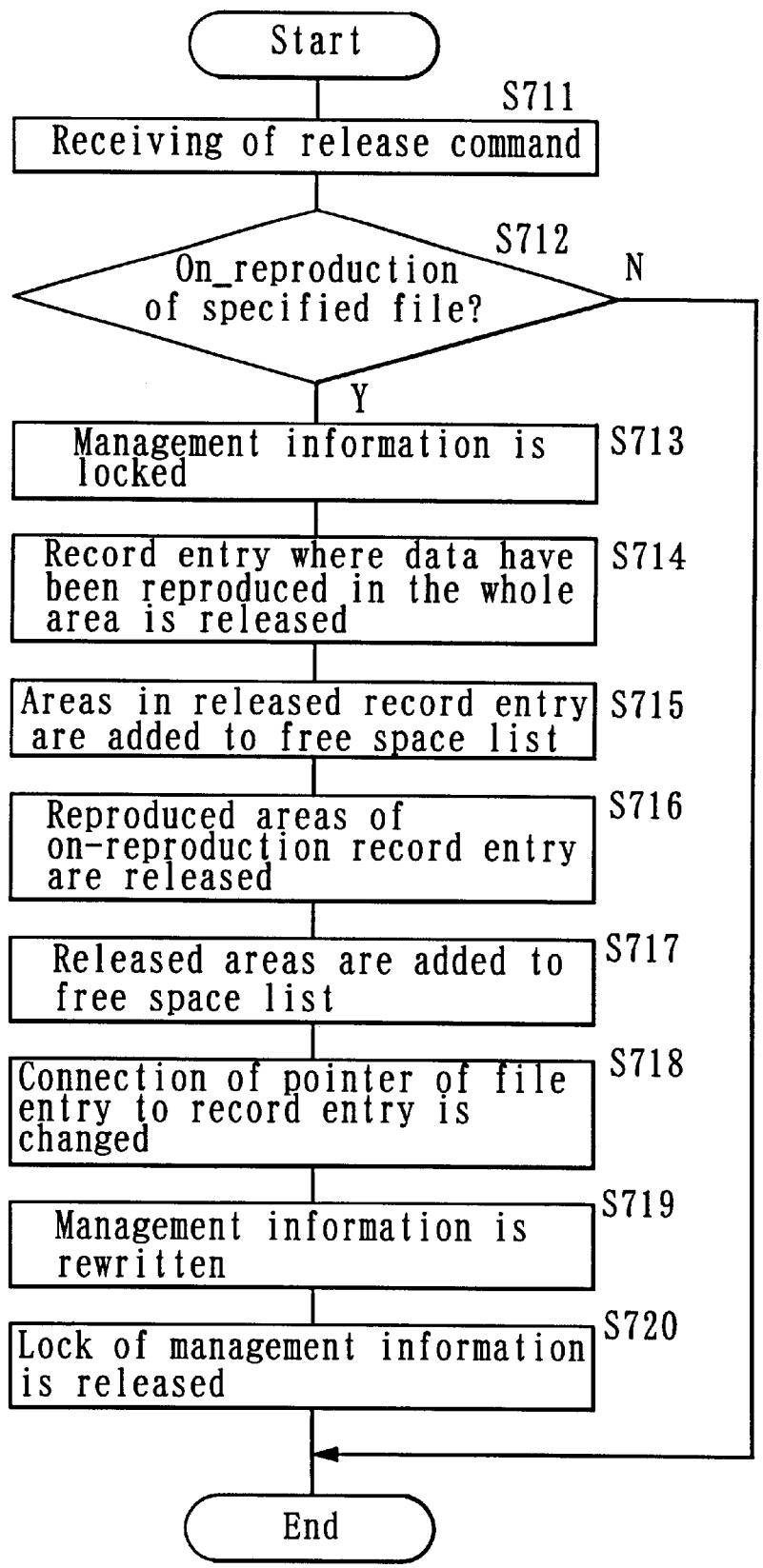
FIG. 20 is a flow chart for explaining an operation which is performed when the data recording and reproducing apparatus shown in FIG. 1 receives the release instruction.

The following will describe the operation to be performed by the data recording and reproducing apparatus 10 upon receiving the release instruction with reference to FIG. 20.

As shown in FIG. 20, upon receiving the release instruction from outside (server controller 30) (S711), the data recording reproducing apparatus 10 judges as to whether or not a file specified by the release instruction is being reproduced in the data accumulation means 43 (data accumulation section 13) (S712). Here, when the specified is not being reproduced (S712;N), the data recording and reproducing apparatus 10 ends the process by the release instruction.

In addition, when the specified file is being reproduced (S712;Y), the data recording and reproducing apparatus 10 locks (inhibits changing according to the other processes) the management information so that the management information is not changed according to the other processes during on-reproduction of the process according to the release instruction (S713).

Next, the file system management means 44 of the data recording and reproducing apparatus 10 corrects (changes) the management information according to the release instruction. Here, the on-correcting management information is not cataloged in the management information storage area 23*b* of the RAM 23 during correction of the management information but held in the work area 23*a* of the RAM 23, and after the correction is completed, the corrected management information is cataloged in the management information storage area 23*b*. The data recording and reproducing apparatus 10 first releases the record entry where data have been reproduced in the whole area in the management information about the specified file as the process for correcting management information according to the release instruction (S714). Then, the released area is added to the free space list (S715). Here, the record entry where data have been reproduced in the whole area is at least one record entry corresponding to divided areas where reproduction has been executed completely in plural divided areas when the specified file is divided into plural parts so as to be recorded in plural areas, for example.

Next, the data recording and reproducing apparatus 10 releases areas where the reproduction has been executed in the record entry representing the recording areas for on-reproducing data in the management information about the specified file (S716). Then, the data recording and reproducing apparatus 10 adds the released areas to the free space list (S717). Here, the reproduction area in the record entry representing recording area for on-reproducing data is an area corresponding to a portion where the data have been reproduced in the area represented by the record entry in the case where the data recorded in the area represented by a certain record entry are being reproduced. Moreover, a judgment is made in the following manner, for example, as to how long the area, where the reproduction has been executed, occupies the recording area represented by the record entry. Namely, the CPU 21 of the server control means 42 counts reproduction time in an internal counter so as to judge that the area, where the data have been recorded, corresponding to the counted time is the area where the data have been reproduced.

When the area where the data have been recorded is released in the above manner, the position of the pointer to the record entry of the file entry about the specified file is changed. For this reason, the data recording and reproducing apparatus 10 changes the connection of the pointer into the changed record entry (S718). When the processes at S714 through S718 are executed as mentioned above, the management information corrected according to the release instruction is created.

Next, the data recording and reproducing apparatus 10 rewrites and updates the management information owned by the file system management means 44 into the corrected management information (S719) and releases the lock of the management information (S720) to end the process according to the release instruction.

The following will describe particularly the procedure of creating the management information created according to the release instruction with reference to FIGS. 21 and 22. FIG. 21 shows one example of a change in the recording area in the data accumulation means 43 (data accumulation section 13) according to the release instruction. FIG. 22 shows a change in the management information owned by the file system management means 44 to be written according to the release instruction in the example shown in FIG. 21. Here, in FIGS. 21 and 22, for convenience, address coincides with "minute".

Figure 21A:
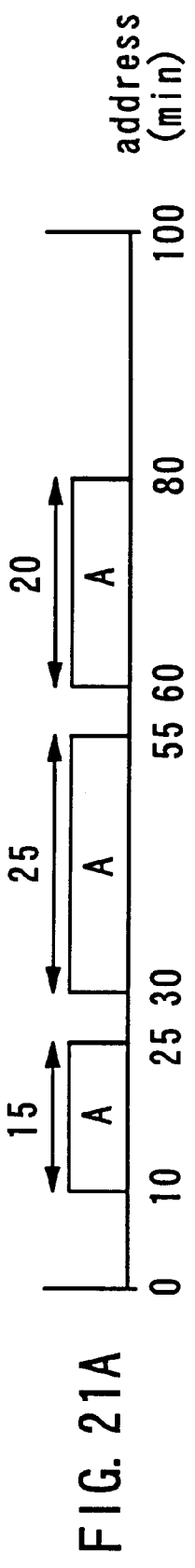
FIGS. 21A through 21C are explanatory diagrams showing particular examples of a change in areas for data recording according to the operation shown in FIG. 20.

As shown in FIG. 21A, for example, before execution of the release instruction, in address space in the data accumulation means 43 whose total capacity is 100 minutes, the data in the file A are recorded into three areas, i.e., address 10 to 24 (15 minutes), address 30 to 54 (25 minutes) and address 60 to 79 (20 minutes). At this time, space areas are divided into four area portions, i.e., address 0 to 9 (10 minutes), address 25 to 29 (5 minutes), address 55 to 59 (5 minutes) and address 80 to 99 (20 minutes).

The area information shown in FIG. 21A is represented by the management information shown in FIG. 22A. First the information corresponding to an area where the file A has been recorded is represented by file entry and record entry. Namely, "A" is described in the item of the file name in the file entry (FE), and "10" and "15" are described respectively in the items of the head position data and the size data in the record entry (RE-1) linked with the file entry. Moreover, "30" and "25" are described respectively in the items of the head position data and the size data in the next record entry (RE-2) linked by the pointer of the record entry (RE-1). Further, "60" and "20" are described respectively in the items of the head position data and the size data in the next record entry (RE-3) linked by the pointer of the record entry (RE-2). Moreover, "EOF" representing end of data is described in the item of the pointer to record entry next to the record entry (RE-3).

In addition, the information corresponding to space areas is represented by free space list. Namely, "0" and "10" are described respectively in the items of the head position data and the size data in the first free space list (FSL-1). Moreover, "25" and "5" are described respectively in the items of the head position data and the size data in the next free space list (FSL-2) linked by the pointer of the free space list (FSL-1). Further, "55" and "5" are described respectively in the items of the head position data and the size data in the next free space list (FSL-3) linked by the pointer of the free space list (FSL-2). Furthermore, "80" and "20" are described respectively in the items of the head position data and the size data in the next free space list (FSL-4) linked by the pointer of the free space list (FSL-3). Moreover, "EOL" representing end of list is described in the item of the pointer to free space list next to the free space list (FSL-4).

In the case where just when the file A recorded as shown in FIG. 21A is reproduced for 25 minutes, the release instruction is executed on the file A, the whole area represented by the record entry (RE-1) and partial area of the first 10 minutes in the area represented by the recorded entry (RE-2) (also shown in FIG. 22A) are released.

Figure 21B:
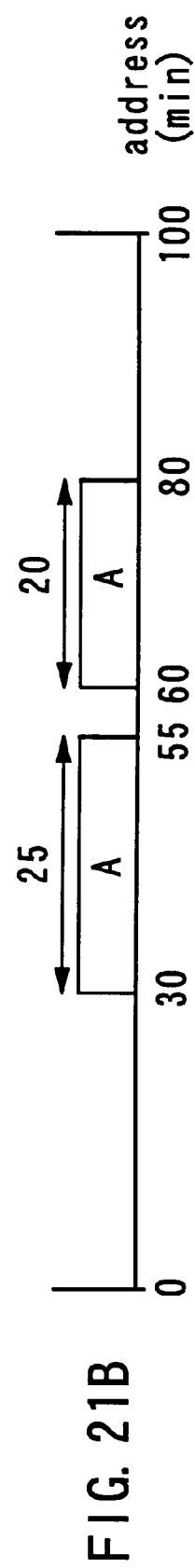
Figure 21C:
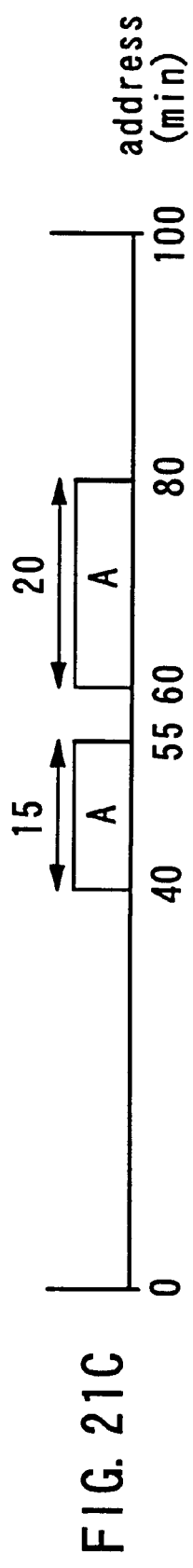

First, when the whole area represented by the record entry (RE-1) shown in FIG. 22A is released, the state of an area is as shown in FIG. 21B, and the management information at this time is in a state shown in FIG. 22B. This state corresponds to the case where the processes at S714 and S715 in FIG. 20 are executed.

As for the management information shown in FIG. 22B, the record entry (RE-1) is deleted by releasing the record entry (RE), and the record entry linked with the file entry is changed into the record entry (RE-2). Moreover, as for the free space list, the item of the size data in the free space list (FSL-1) is changed from "10" into "30", and the free space list (FSL-2) is deleted. Moreover, according to the deletion of the free space list (FSL-2), the free space list (FSL-1) is linked with the free space list (FSL-3).

Further, after the whole area represented by the record entry (RE-1) is released, an area for 10 minutes of the area represented by the record entry (RE-2) is released. As a result, the area is in a state shown in FIG. 21C, and the management information at this time is in a state shown in FIG. 22C. This state corresponds to the case where the processes at S716 and S717 in FIG. 20 are executed.

As for the management information shown in FIG. 22C, from the state of the management information shown in FIG. 22B, the items of the head position data and the size data in the record entry (RE-2) are changed respectively into "40" and "15" by partially releasing the record entry (RE-2). Moreover, as for the free space list, the item of the size data in the free space list (FSL-1) is changed into "40".

The following will describe an example of the operation of the data recording and reproducing apparatus 10 in the case where the release instruction is executed according to recording of plural data. Here, the description will be given as to the case where the file A whose data amount is 40 minutes and the file B whose data amount is 30 minutes are recorded in the data accumulation means 43 (data accumulation section 13) whose data recording capacity is 60 minutes. Moreover, there considers the case where whole area for data recording in the data accumulation means 43 is first free, and data in the file A and the file B are recorded in this order in the data accumulation means 43 in the free state, and the recorded data are reproduced one by one.

Figures 23A, 23B:
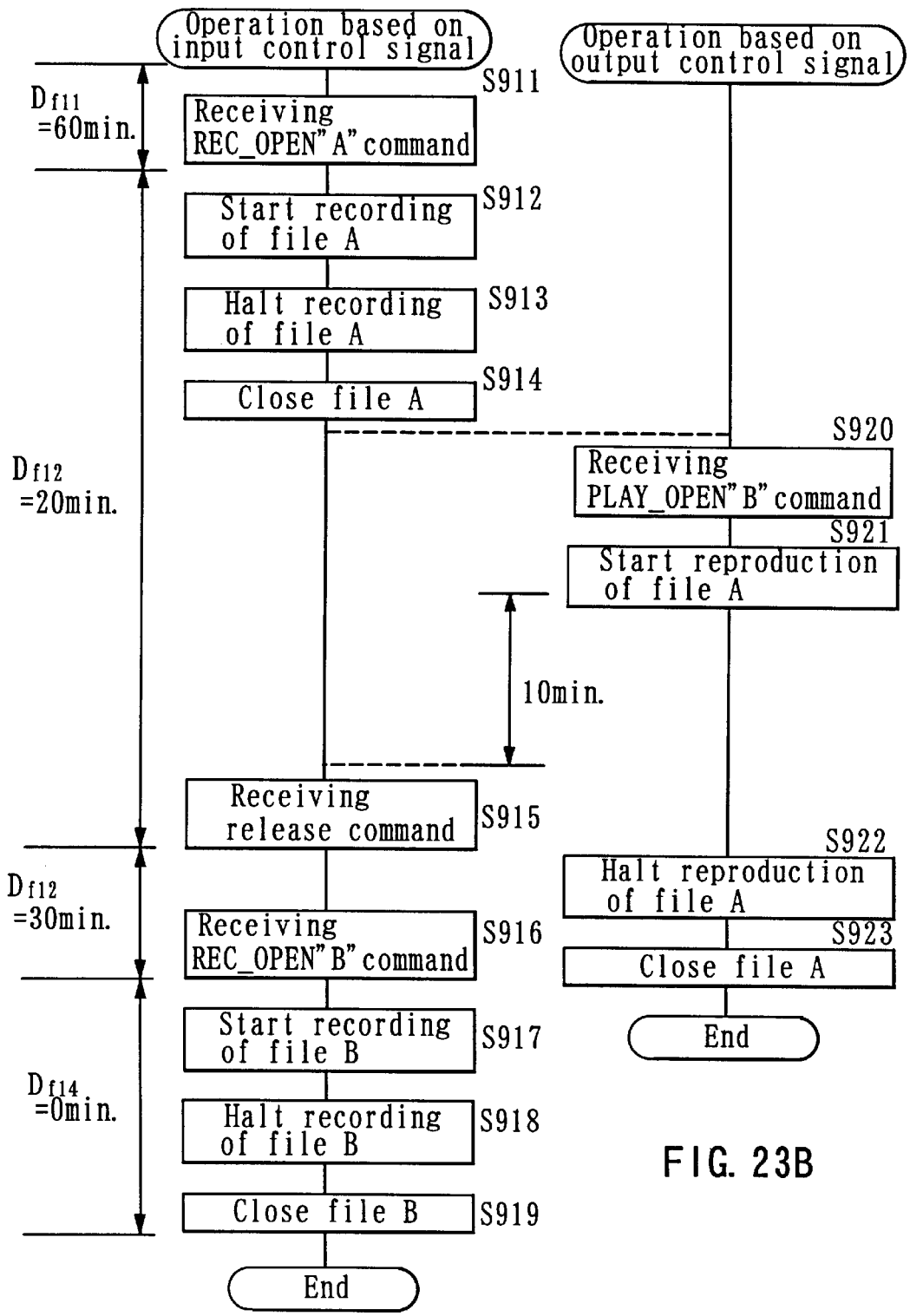
FIGS. 23A and 23B are explanatory diagrams showing examples of operations of the data recording and reproducing apparatus shown in FIG. 1 based on the control signals.

FIG. 23 is an explanatory diagram showing the operation of the data recording and reproducing apparatus 10 in the case where the file A and the file B are recorded and reproduced in the above manner. FIG. 23A shows the operation based on the input control signal $S_1$, and FIG. 23B shows the operation based on the output control signal $S_2$. FIG. 24 shows a change in an area for data recording in the data accumulation means 43 (data accumulation section 13) according to the operations shown in FIG. 23. FIG. 25 shows a change in the management information owned by the file system management means 44 according to the operations shown in FIG. 23. Here, in FIGS. 24 and 25, for convenience, address coincides with "minute".

Figure 24A:
FIGS. 24A through 24D are explanatory diagrams showing a change in areas for data recording according to the operations shown in FIGS. 23A and 23B.
Figure 25A:
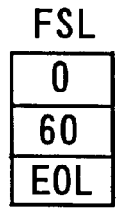
FIGS. 25A through 25D are explanatory diagrams showing a change in the management information according to the operations shown in FIGS. 23A and 23B.

As shown in FIG. 23A, the data recording and reproducing apparatus 10 receives the instruction for requesting preparation of recording of the file A (REC_OPEN "A" command) as the input control signal $S_1$ from outside (server controller 30) (S911). At this time, an area for data recording in the data accumulation means 43 is, as shown in FIG. 24A, free, and a recordable data amount $D_{f11}$ is 60 minutes in time. Moreover, the management information owned by the file system management means 44 at this time is represented as shown in FIG. 25A by the free space list (FSL) shown in FIG. 3C. Namely, "0" and "60" are described respectively in the items of the head position data and the size data, and "EOL" representing end of list is described in the item of the pointer to the next free space list.

Figure 24B:
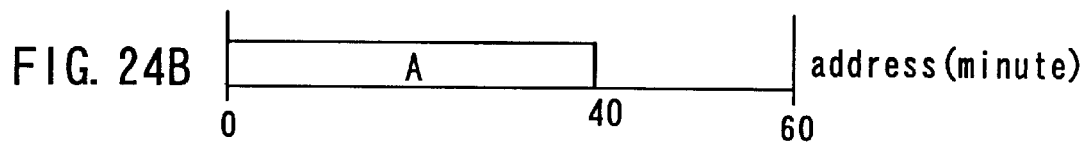
Figure 25B:
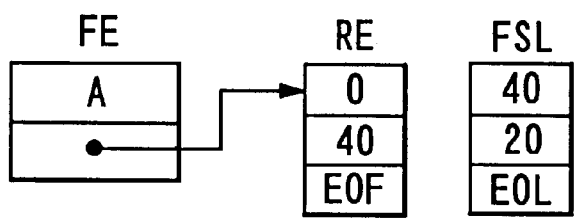

Upon receiving the REC_OPEN "A" command, the data recording and reproducing apparatus 10 reserves an area for recording the file A by 40 minutes as shown in FIG. 24B, for example, based on the management information owned by the file system management means 44. At this time, the file system management means 44 of the data recording and reproducing apparatus 10 corrects (changes) the management information according to the reservation of the area for recording the file A. The corrected management information is as shown in FIG. 25B. When the management information is corrected in such a manner, an amount $D_{f12}$ of data other than the data in the file A which can be recorded in the data accumulation means 43 becomes 20 minutes in time.

The information in the management information shown in FIG. 25B corresponding to the area for recording the file A is represented by using file entry (FE) and record entry (RE). Namely, "A" is described in the item of the file name in the file entry, and "0" and "40" are described respectively in the items of the head position data and the size data in the record entry linked with the file entry. Moreover, "EOF" representing end of data is described in the item of the pointer to the next record entry. Moreover, "40" and "20" are described respectively in the items of the head position data and the size data in the free space list representing space areas, and "EOL" representing end of list is described in the item of the pointer to the next free space list.

The data recording and reproducing apparatus 10 receives REC_OPEN "A" command, reserves the area for recording the file A and corrects the management information. Thereafter, upon receiving the recording instruction from outside (server controller 30) for actually starting the recording of the file A, the data recording and reproducing apparatus 10 starts to record the data in the file A in the reserved area of the data accumulation means 43 (S912).

Next, upon receiving the recording halt instruction from outside (server controller 30) for halting the recording of the file A, the data recording and reproducing apparatus 10 halts the recording of the file A (S913).

In addition, upon receiving the close instruction from outside (server controller 30), the data recording and reproducing apparatus 10 corrects (updates) the management information owned by the file system management means 44 and closes the file (S914). Here, in the file system management means 44, if there exists a difference between the management information first created by the server control means 42 and the area where the data have been actually recorded, the difference is adjusted as the process for closing the file. Here, the file A is recorded as shown in FIG. 24B according to the management information first created.

When the file A is recorded in the above-mentioned manner, as shown in FIG. 24B, the area where the data have been recorded occupied by the file A in the data accumulation means 43 is 40 minutes, and the recordable area where another data can be recorded is 20 minutes. Therefore, the file B whose data amount is 30 minutes cannot be recorded at this time. Accordingly, next, after the file A is reproduced for at least 10 minutes, the reproduced file A is partially released.

As shown in FIG. 23B, when the data recording and reproducing apparatus 10 reproduces the file A, it receives the instruction for requesting preparation of reproduction of the file A (PLAY_OPEN "A" command) as the output control signal $S_2$ from outside (server controller 30) (S920).

Upon receiving the PLAY_OPEN "A" command, the data recording and reproducing apparatus 10 retrieves the area information for reproducing the file A based on the management information owned by the file system management means 44. Then, upon receiving the reproduction instruction for actually starting reproduction of the file A from outside (server controller 30), the data recording and reproducing apparatus 10 starts the reproduction of the data in the file A from the data accumulation means 43 based on the retrieved area information (S921).

Next, upon receiving the reproduction halt instruction for halting the reproduction of the file A from outside (server controller 30), the data recording and reproducing apparatus 10 halts the reproduction of the file A (S922).

In addition, upon receiving the close instruction from outside (server controller 30), the data recording and reproducing apparatus 10 closes the file (S923), and ends the reproduction of the file A.

Figure 24C:
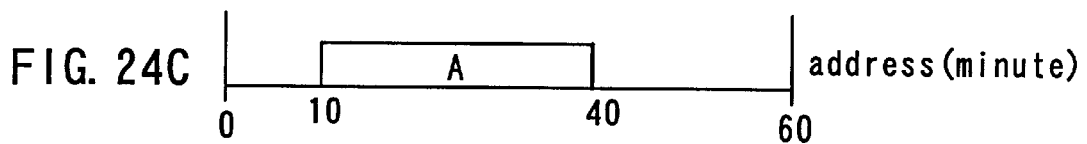

Meanwhile, the data recording and reproducing apparatus 10 starts the reproduction of the file A at S921, and reproduces the file A for 10 minutes. Thereafter, as shown in FIG. 23B, upon receiving the release instruction of the file A from outside (server controller 30) (S915), the data recording and reproducing apparatus 10 releases the area where the file A has been reproduced according to the release instruction. At this time, the area for data recording in the data accumulation means 43 is as shown in FIG. 24C. Namely, the area of address 0 to 9 is released, and an area where new data can be recorded is created. As a result, in addition to the area of address 40 to 59 which is free before executing the release instruction, a recordable data amount $D_{f13}$ becomes 30 minutes in time. Therefore, the file B by 30 minutes can be recorded at this time.

Figure 25C:
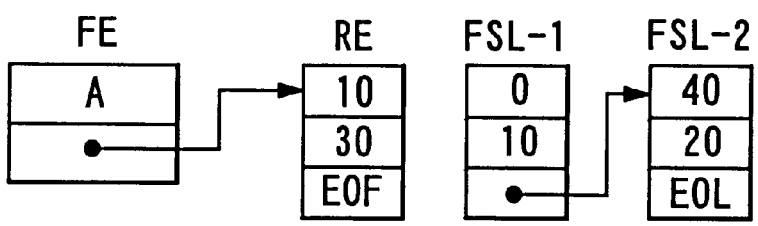

In addition, the file system management means 44 of the data recording and reproducing apparatus 10 corrects (changes) the management information according to the execution of the release instruction. The corrected management information is represented as shown in FIG. 25C. Namely, as for the management information shown in FIG. 25B, the items of the head position data and the size data in the record entry corresponding to the area for recording the file A are changed respectively into "10" and "30" so that the management information shown in FIG. 25C is created. Moreover, two lists FSL-1 and FSL-2 are created as free space list representing space areas. "0" and "10" are described respectively in the items of the head position data and the size data in the free space list (FSL-1). Further, "40" and "20" are described respectively in the items of the head position data and the size data in the next free space list (FSL-2) linked by the pointer of the free space list (FSL-1), and "EOL" representing end of list is described in the item of the pointer to the next free space list.

Next, the data recording and reproducing apparatus 10 receives the instruction for requesting preparation of recording of the file B (REC_OPEN "B" command) as the input control signal $S_1$ from outside (server controller 30) (S916).

Figure 24D:
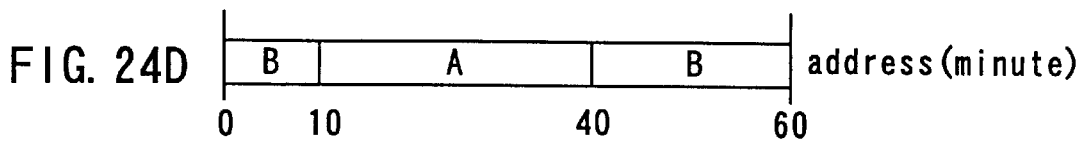
Figure 25D:
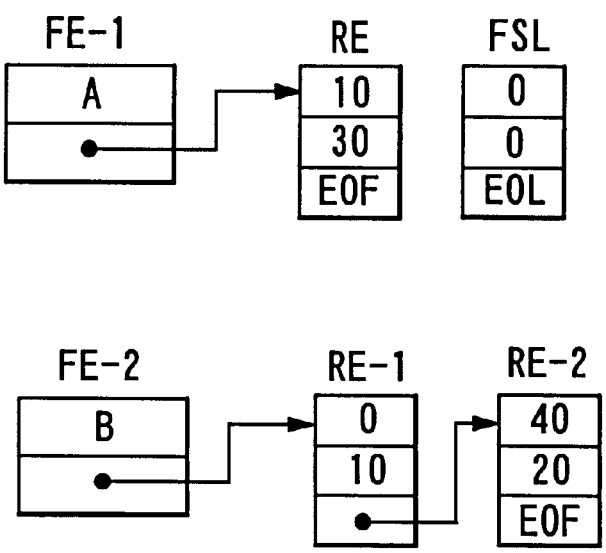

Upon receiving the REC_OPEN "B" command, the data recording and reproducing apparatus 10 reserves an area for recording the file B by 30 minutes as shown in FIG. 24D based on the management information owned by the file system management means 44. At this time, the file system management means 44 of the data recording and reproducing apparatus 10 corrects (changes) the management information according to the reservation of the area for recording the file B. The corrected management information is as shown in FIG. 25D. When the management information is corrected, an amount $D_{f14}$ of data other than the data in the file B, which can be recorded in the data accumulation means 43, becomes 0 minute in time.

The management information shown in FIG. 25D is composed of the information corresponding to the areas for recording the file A and the file B and the information about space areas. The information corresponding to the area for recording the file A is represented by using file entry (FE-1) and one record entry (RE). The record entry (RE) of the file A is the same as that in FIG. 25C. Meanwhile, the information corresponding to the area for recording the file B is represented by using the file entry (FE-2) and two record entries (RE-1 and RE-2). "B" is described in the item of the file name in the file entry (FE-2), and "0" and "10" are described respectively in the items of the head position data and the size data in the record entry (RE-1) linked with the file entry (FE-2). Moreover, "40" and "20" are described respectively in the items of the head position data and the size data in record entry (RE-2) next to the record entry (RE-1), and "EOF" representing end of data is described in the item of the pointer of record entry next to the record entry (RE-2). Further, "0" and "0" are described respectively in the items of the head position data and the size data in free space list representing space areas, and "EOL" representing end of list is described in the item of the pointer to the next free space list.

The data recording and reproducing apparatus 10 receives the REC_OPEN "B" command, and reserves the area for recording the file B and corrects the management information. Thereafter, upon receiving the recording instruction from outside (server controller 30) for actually starting recording of the file B, the data recording and reproducing apparatus 10 starts the recording of the data in the file B into the revered area of the data accumulation means 43 (S917).

Next, upon receiving the recording halt instruction from outside (server controller 30) for halting the recording of the file B, the data recording and reproducing apparatus 10 halts the recording of the file B (S918).

In addition, the file system management means 44 of the data recording and reproducing apparatus 10 receives the close instruction from outside (server controller 30), the file system management means 44 corrects (updates) the management information and closes the file (S919), and ends the recording of the file B.

As mentioned above, when the release instruction is received at the time when the file A is reproduced for 10 minutes, the area where the file A has been released is released so as to be changed into a recordable area, and thus even before the whole file A is reproduced and deleted, the file B can be recorded.

Figure 26A:
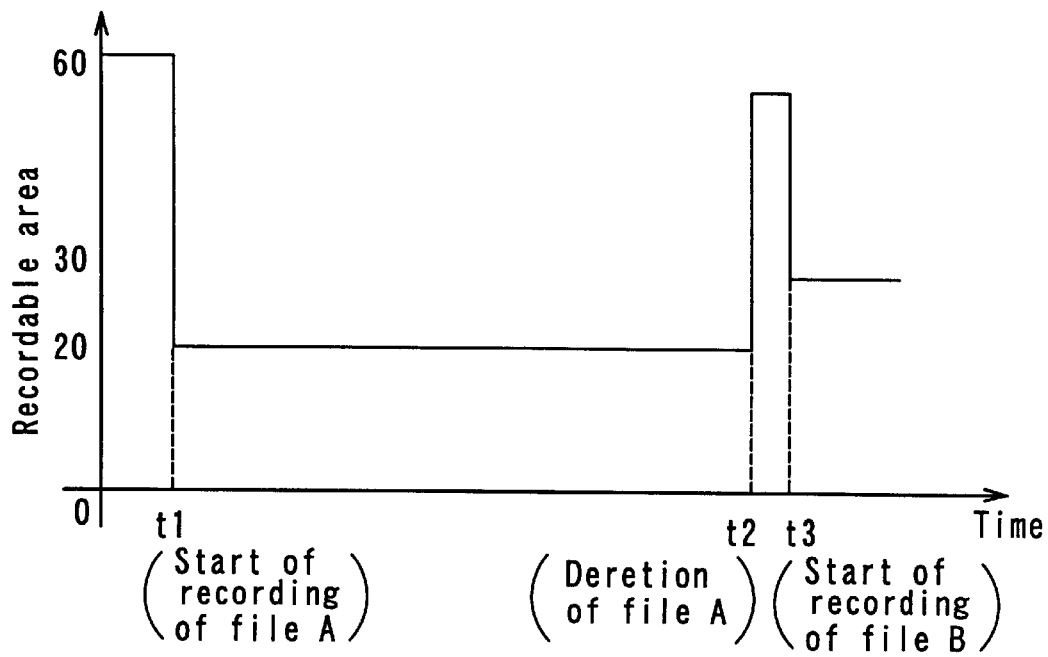
FIGS. 26A through 26B are explanatory diagrams for comparing changes in recordable areas in the operations shown in FIGS. 7A and 7B and the operations shown in FIGS. 23A and 23B.
Figure 26B:
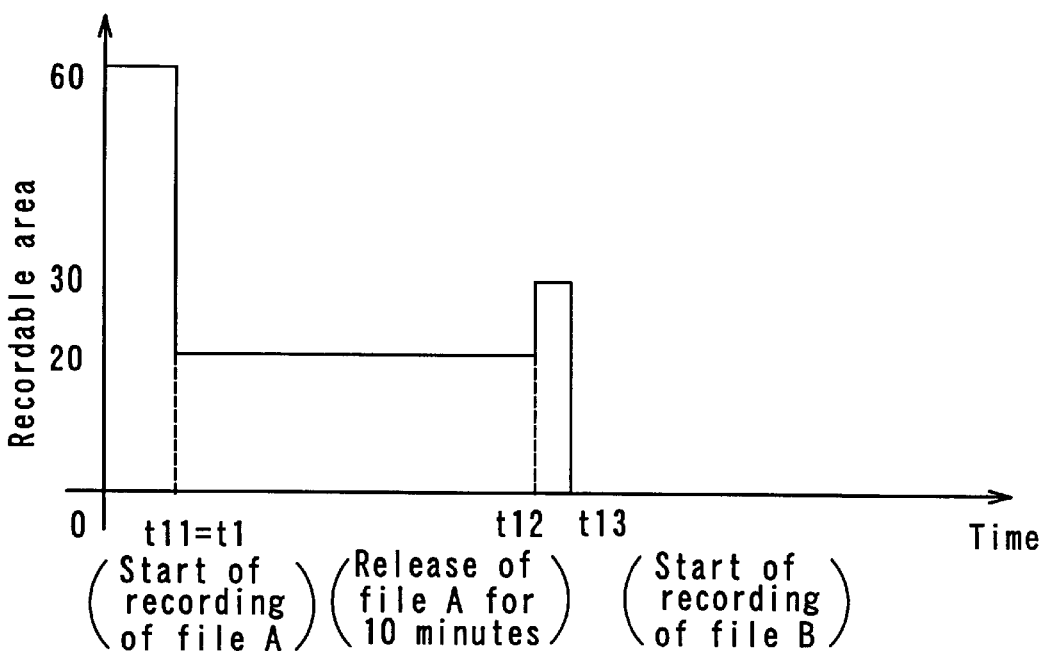
Figure 27:
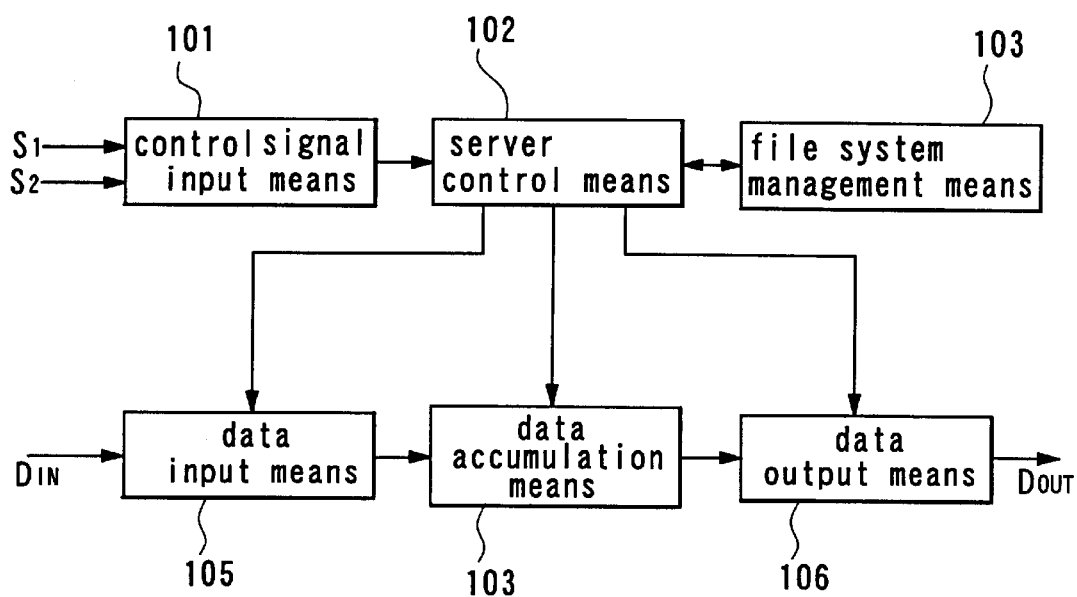
FIG. 27 is a block diagram showing a constitution of a data recording and reproducing apparatus of the related art.

FIGS. 26A and 26B show an explanatory diagram where changes in recordable areas between the operation shown in FIG. 7 and the operation shown in FIG. 23 are compared. Namely, FIG. 26A shows a change in the recordable area when the release instruction is not received, and FIG. 26B shows a change in the recordable area when the release instruction is received. In FIGS. 26A and 26B, the vertical axis represents the recordable area, and the horizontal axis represents time.

As shown in FIG. 26A, when the recording of the file A is started ($t_1$), the recordable area becomes 20 minutes in time. Next, when after the recording of the file A is ended, the file A is reproduced completely and deleted ($t_2$), the recordable area becomes 60 minutes. When the recording of the file B is started ($t_3$), the recordable area becomes 30 minutes.

Meanwhile, as shown in FIG. 26B, when the recording of the file A is started ($t_{11}=t_1$), the recordable area becomes 20 minutes in time. Next, when after the recording of the file A is ended, the file A is reproduced for 10 minutes and the data in the file A of 10 minutes are released ($t_{12}$), the recordable area becomes 30 minutes. Then, when the recording of the file B is started ($t_{13}$), the recordable area becomes 0 minute.

In the operation shown in FIG. 23 under the release instruction, it is found that the area for data recording in the data accumulation means 43 (data accumulation section 13) is used efficiently. Moreover, in FIG. 26, as is clear from comparing the starting times $t_3$ and $t_{13}$ when the file B is recorded, in the operation under the release instruction, the time $t_{13}$ when the recording of the file B is started is earlier than the time $t_3$. This is because in the operation shown in FIG. 23, after the release instruction is generated, the file B can be recorded without waiting the complete reproduction of the file A. As is clear from this, the total time required for recording data is shortened by generating the release instruction.

As mentioned above, in the data recording and reproducing apparatus 10 according to the present embodiment, the management information is changed so that while the data in an arbitrary file is being reproduced, the area where the reproduced data of the data in the file are recorded becomes a recordable area according to the release instruction from outside (server controller 30). For this reason, before the on-reproducing file is reproduced completely, new data can be recorded in an area occupied by the on-reproduced data, and the area for data recording in the data accumulation means 43 (data accumulation section 13) can be utilized efficiently. As a result, in the case where plural data are recorded, for example, a problem that data cannot be recorded due to less recordable area can be decreased. Moreover, the time required for recording plural data can be shortened.

As mentioned above, the present invention outputs the reproduction position information representing a reproduction position of data in a recording medium, and the occasional release instruction for executing the occasional release process so that while the data are being reproduced from a recording medium, new data can be recorded in the area in the recording medium where the reproduced data are recorded. Moreover, the present invention changes management information representing an area in the recording medium where the data have been recorded and a recordable area where data can be recorded, and manages management information so that the occasional release process is executed on the recording medium. As a result, new data can be recorded in the area occupied by the reproduced data anytime before the on-reproducing file is reproduced completely. Therefore, the present invention has the effect that an area in the data accumulation means for data recording can be utilized efficiently.

In addition, when data is being reproduced from a recording medium, the present invention inputs the release instruction for executing the release process so that new data can be recorded in an area in the recording medium where the reproduced data are recorded, and changes management information representing an area in the recording medium where the data have been recorded and recordable areas data can be recorded based on the inputted release instruction. Moreover, the present invention manages the management information so that the release process is executed on the recording medium. As a result, before on-reproducing file is reproduced completely, new data can be recorded in an area occupied by the reproduced data. Therefore, the present invention has the effect that an area in the data accumulation means for data recording can be utilized efficiently.

Based on the description as above, obviously many modifications and variations of the present invention are possible. Accordingly, the present invention may also be practiced in embodiments other than those described above, within the equivalent scope of the following claims.

What is claimed is:

1. Audio/video data recording and reproducing apparatus, comprising:
   a recorder/reproducer for recording data on and reproducing data from a non-linear recording medium;
   a controller for controlling the reproduction of data by the recorder/reproducer and for outputting reproduction position information which represents a position on the recording medium occupied by the reproduced data and, while the data is being reproduced from the recording medium, outputting a release instruction for releasing an area on the recording medium occupied by the reproduced data so that new data can be recorded in said area;
   a data manager for processing management information including recorded area information which represents the area on the recording medium occupied by the data and recordable area information which represents a recordable area where data can be recorded, by changing said management information, as a function of said release instruction and said reproduction position information outputted from the controller, so that new data can be recorded in the area corresponding to the release instruction;
   a reproduction position transmitter for transmitting the reproduction position information outputted from the controller to the data manager; and
   a free space determining means for determining a free space area on said recording medium, increasing said free space area by said area occupied by the reproduced data that was released, and outputting an instruction to record said new data when said free space area is equal to or greater than said new data, whereby said area occupied by said reproduced data is released as needed.

2. The apparatus according to claim 1, wherein the data manager changes the management information so that said information representing the area on the recording medium occupied by the reproduced data is deleted from the recorded area information and information representing the area occupied by the reproduced data is added to the recordable area information.

3. The apparatus according to claim 1, further including means for providing a reproduce instruction to prepare for the reproduction of data from the recorder/reproducer; and wherein the controller outputs the release instruction to the data manager when the release instruction is included in the reproduce instruction.

4. The apparatus according to claim 1, wherein the recorded area information included in the management information is comprised of a file entry and a record entry, said file entry including a file name of the data recorded on the recording medium and a pointer representing a link destination to the record entry, and said record entry including head position data representing an address of the head position of the area on the recording medium occupied by the data represented by the file entry, size data representing a length of the area continuous from the head position address, and when data in a file occupy non-continuous areas, pointers representing a link destination between the non-continuous areas.

5. The apparatus according to claim 1, herein the recordable area information included in the management information is comprised of head position data representing an address of the head position of a space area on the recording medium where data is not recorded, size data representing a length of said space area continuous from the head position address, and a pointer representing a link destination to a next space area.

6. Audio/video data recording and reproducing apparatus, comprising:
   a recorder/reproducer for recording data on and reproducing data from a non-linear recording medium;
   a controller operable while data is being reproduced from the recording medium to input a release instruction for releasing an area on the recording medium occupied by the reproduced data so that new data can be recorded in said area, said controller controlling the recorder/reproducer by changing management information that includes recorded area information which represents the area on the recording medium occupied by the data and recordable area information which represents a recordable area where data can be recorded as a function of the inputted release instruction, so that new data can be recorded in the area corresponding to the release instruction; and a free space determining means for determining a free space area on said recording medium, increasing said free space area by said area occupied by the reproduced data that was released, and outputting an instruction to record said new data when said free space area is equal to or greater than said new data, whereby said area occupied by said reproduced data is released as needed.

7. The apparatus according to claim 6, wherein the controller controls the recorder/reproducer to record new data in the area occupied by the data being reproduced up until the release instruction is inputted.

8. The apparatus according to claim 6, wherein the controller changes the management information so that said information representing the area on the recording medium occupied by the reproduced data is deleted from the recorded area information and information representing the area occupied by the reproduced data is added to the recordable area information.

9. The apparatus according to claim 8, wherein the controller changes the management information when the release instruction is inputted for recording new data in plural non-continuous areas on the recording medium, so that the information representing the area on the recording medium occupied by the reproduced data is deleted from the recorded area information, and the information representing the area occupied by the reproduced data is added to the recordable area information.

10. The apparatus according to claim 6, wherein the recorded area information included in the management information is comprised of a file entry and a record entry, said file entry including a file name of data recorded on the recording medium and a pointer representing a link destination to the record entry, and said record entry including head position data representing an address of the head position of the area on the recording medium occupied by the data represented by the file entry, size data representing a length of the area continuous from the head position address, and when data in a file occupy non-continuous areas, pointers, representing a link destination between the non-continuous areas.

11. The apparatus according to claim 6, wherein the recordable area information included in the management information is comprised of head position data representing an address of the head position of a space area on the recording medium where data is not recorded, size data representing a length of said space area continuous from the head position address, and a pointer representing a link destination to a next space area.

12. A method for recording audio/video data on and reproducing data from a non-linear recording medium, comprising the steps of:

reproducing data from the recording medium and outputting reproduction position information which represents a position on the recording medium occupied by the reproduced data and, while the data is being reproduced from the recording medium, outputting a release instruction for releasing an area on the recording medium occupied by the reproduced data so that new data can be recorded in said area;

transmitting the reproduction position information;

processing management information including recorded area information which represents the area on the recording medium occupied by the data and recordable area information which represents a recordable area where data can be recorded, by changing said management information, as a function of said release instruction and said reproduction position information so that new data can be recorded in the area corresponding to the release instruction;

determining a free space area on said recording medium;

increasing said free space area by said area occupied by the reproduced data that was released; and outputting an instruction to record said new data when said free space area is equal to or greater than said new data, whereby said area occupied by said reproduced data is released as needed.

13. The method according to claim 12, wherein said management information is changed so that said information representing the area on the recording medium occupied by the reproduced data is deleted from the recorded area information and information representing the area occupied by the reproduced data is added to the recordable area information.

14. The method according to claim 12, further including the step of providing a reproduce instruction to prepare for the reproduction of data from the recording medium, and wherein the release instruction is included in said reproduce instruction and is outputted therefrom.

15. The method according to claim 12, wherein the recorded area information included in the management information is comprised of a file entry and a record entry, said file entry including a file name of data recorded on the recording medium and a pointer representing a link destination to the record entry, and said record entry including head position data representing an address of the head position of the area on the recording medium occupied by the data represented by the file entry, size data representing a length of the area continuous from the head position address, and when data in a file occupy non-continuous areas, pointers representing a link destination between the non-continuous areas.

16. The method according to claim 12, wherein the recordable area information included in the management information is comprised of head position data representing an address of the head position of a space area on the recording medium where data is not recorded, size data representing a length of said space area continuous from the head position address, and a pointer representing a link destination to next space area.

17. A method for recording audio/video data on and reproducing data from a non-linear recording medium, comprising the steps of:

reproducing data from the recording medium;

inputting a release instruction while data is being reproduced from the recording medium for releasing an area on the recording medium occupied by the reproduced data so that new data can be recorded in said area;

controlling recording and reproduction by changing management information that includes recorded area information which represents the area on the recording medium occupied by the data and recordable area information which represents a recordable area where data can be recorded, as a function of the inputted release instruction, so that new data can be recorded in the area corresponding to the release instruction;

determining a free space area on said recording medium;

increasing said free space area by said area occupied by the reproduced data that was released; and outputting an instruction to record said new data when said free space area is equal to or greater than said new data, whereby said area occupied by said reproduced data is released as needed.

18. The method according to claim 17, wherein recording and reproduction is controlled so that new data is recorded in the area occupied by the data being reproduced until the release instruction is inputted.

19. The method according to claim 17, wherein the management information is changed so that said information representing the area on the recording medium occupied by the reproduced data is deleted from the recorded area information and information representing the area occupied by the reproduced data is added to the recordable area information.

20. The method according to claim 19, wherein the management information is changed when the release instruction is inputted for recording new data in plural non-continuous areas on the recording medium, so that the information representing the area on the recording medium occupied by the reproduced data is deleted from the recorded area information and the information representing the area occupied by the reproduced data is added to the recordable area information.

21. The method according to claim 17, wherein the recorded area information included in the management information is comprised of a file entry and a record entry, said file entry including a file name of data recorded on the recording medium and a pointer representing a link destination to the record entry, and said record entry including head position data representing an address of the head position of the area on the recording medium occupied by the data represented by the file entry, size data representing a length of the area continuous from the head position address, and when data in a file occupy non-continuous areas, pointers representing a link destination between the non-continuous areas.

22. The method according to claim 17, wherein the recordable area information included in the management information is comprised of head position data representing an address of the head position of a space area on the recording medium where data is not recorded, size data representing a length of said space area continuous from the head position address, and a pointer representing a link destination to a next space area.

* * * * *